United States Patent
Wang et al.

(10) Patent No.: US 12,047,954 B2
(45) Date of Patent: Jul. 23, 2024

(54) TECHNIQUES FOR SIDELINK RESOURCE CANCELLATION USING TIME RESOURCE INDICATOR VALUE

(71) Applicant: QUALCOMM Incorporated, San Diego, CA (US)

(72) Inventors: Xiaojie Wang, Hillsborough, NJ (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/495,387

(22) Filed: Oct. 6, 2021

(65) Prior Publication Data
US 2022/0116928 A1  Apr. 14, 2022

Related U.S. Application Data

(60) Provisional application No. 63/090,043, filed on Oct. 9, 2020.

(51) Int. Cl.
H04W 72/00 (2023.01)
H04W 72/20 (2023.01)

(52) U.S. Cl.
CPC .................. *H04W 72/20* (2023.01)

(58) Field of Classification Search
CPC ......... H04W 72/00; H04L 12/28; H04L 12/50
USPC .................. 370/329, 400, 395, 403
See application file for complete search history.

(56) References Cited

U.S. PATENT DOCUMENTS

2016/0182388 A1* 6/2016 Tsuruoka .............. H04L 47/283
370/315

\* cited by examiner

*Primary Examiner* — Dang T Ton
(74) *Attorney, Agent, or Firm* — Arun Swain

(57) ABSTRACT

Methods, systems, and devices for wireless communications are described. A first user equipment (UE) may transmit a first sidelink control information (SCI) message associated with a sidelink transmission from the first UE, the first SCI message including a first indication of a set of resources reserved for retransmissions of the sidelink transmission at one or more retransmission occasions. The first UE may identify a second SCI message associated with the first SCI message, the second SCI message including one or more time domain resource allocation (TDRA) field values indicative of at least a first subset of the set of resources and a release of the at least first subset of the set of resources reserved for the retransmissions of the sidelink transmission, the release pertaining to at least one retransmission occasion of the one or more retransmission occasions. The first UE may then transmit fewer retransmissions of the sidelink transmission in accordance with the release.

30 Claims, 13 Drawing Sheets

TECHNIQUES FOR SIDELINK RESOURCE CANCELLATION USING TIME RESOURCE INDICATOR VALUE

CROSS REFERENCE

The present application for patent claims the benefit of U.S. Provisional Patent Application No. 63/090,043 by WANG et al., entitled "TECHNIQUES FOR SIDELINK RESOURCE CANCELLATION USING TIME RESOURCE INDICATOR VALUE," filed Oct. 9, 2020, assigned to the assignee hereof, and expressly incorporated by reference herein.

FIELD OF TECHNOLOGY

The following relates to wireless communications, including techniques for sidelink resource cancellation using time resource indicator values (TRIVs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may reserve resources on a sidelink channel to communicate in a vehicle to everything (V2X) wireless communications system. The UE may reserve resources for an initial transmission and, in some cases, one or more retransmissions. Some techniques for efficiently using resources on the sidelink channel can be improved.

SUMMARY

The described techniques relate to improved methods, systems, devices, and apparatuses that support techniques for sidelink resource cancellation using time resource indicator values (TRIVs). Generally, the described techniques provide for the release of previously-reserved sidelink resources. In particular, sidelink control information (SCI) may include an indication that a set of resources which were previously reserved for retransmissions of a sidelink transmission are to be released. For example, a first UE may transmit a first SCI message which reserves resources for a sidelink transmission. In cases where a first transmission of the sidelink transmission is successfully received by a second UE, the first UE (which transmitted the first SCI message) and/or the second UE may transmit a second SCI message which is interpreted as releasing the remaining resources scheduled by the initial SCI. In some aspects, the second SCI message may include one or more time domain resource allocation (TDRA) field values which indicate which previously-reserved resources are to be released. vindicating the release of the resources may include one or more TDRA field values which reserve additional sidelink resources for sidelink communications. The one or more TDRA field values within the second SCI message which are used to indicate the resources which are to be released may include TRIVs which are not associated with reservations of time resources (e.g., "unspecified" TRIVs).

A method of wireless communication at a first UE is described. The method may include transmitting, during a first transmission time interval (TTI), a first SCI message associated with a sidelink transmission from the first UE, where the first SCI message includes a first indication of a set of resources reserved for retransmissions of the sidelink transmission at one or more retransmission occasions, identifying, during a second transmission time interval that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and transmitting the retransmissions of the sidelink transmission on only a second subset of the set of resources in accordance with the release of the first subset of the set of resources.

An apparatus for wireless communication at a first UE is described. The apparatus may include a processor, memory coupled with the processor, and instructions stored in the memory. The instructions may be executable by the processor to cause the apparatus to transmit, during a first TTI, a first SCI message associated with a sidelink transmission from the first UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and transmit the retransmissions of the sidelink transmission on only a second subset of the set of resources in accordance with the release of the first subset of the set of resources.

Another apparatus for wireless communication at a first UE is described. The apparatus may include means for transmitting, during a first TTI, a first SCI message associated with a sidelink transmission from the first UE, where the first SCI message includes a first indication of a set of resources reserved for retransmissions of the sidelink transmission at one or more retransmission occasions, identifying, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and transmitting the retransmissions of the sidelink transmission on only a second subset of the set of resources in accordance with the release of the first subset of the set of resources.

A non-transitory computer-readable medium storing code for wireless communication at a first UE is described. The code may include instructions executable by a processor to transmit, during a first TTI, a first SCI message associated with a sidelink transmission from the first UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and transmit the retransmissions of the sidelink transmission on only a second subset of the set of resources in accordance with the release of the first subset of the set of resources.

Some examples of the method, apparatuses, and non-transitory computer-readable medium described herein may further include operations, features, means, or instructions for identifying that the release pertains to the at least one retransmission occasion based on the identifier of the first SCI message.

Some examples of the method, apparatuses, and non-transitory computer-readable medium described herein may further include operations, features, means, or instructions for identifying one or more SCI message transmissions that may be within a configured TTI range and subchannel range of the second SCI message, identifying, based on the one or more TDRA field values, the first SCI message from the one or more SCI message transmissions, and identifying that the release pertains to the at least one retransmission occasion based on the identification of the first SCI message.

Some examples of the method, apparatuses, and non-transitory computer-readable medium described herein may further include operations, features, means, or instructions for identifying that the one or more TDRA field values may be associated with a checksum or a hashing function of at least a portion of data included within the first SCI message, and identifying that the release pertains to the at least one retransmission occasion based on identifying that the one or more TDRA field values within the second SCI message may be associated with the checksum or the hashing function of at least the portion of data included within the first SCI message.

In some examples of the method, apparatuses, and non-transitory computer-readable medium described herein, the data included within the first SCI message includes a first cyclic redundancy check (CRC) portion of the first SCI message, a set of TDRA values of the first SCI message, a set of frequency domain resource allocation (FDRA) values of the first SCI message, or any combination thereof.

Some examples of the method, apparatuses, and non-transitory computer-readable medium described herein may further include operations, features, means, or instructions for identifying that the one or more TDRA field values may be associated with a checksum or a hashing function of an identifier associated with the first UE, the first TTI, or both, and identifying that the release pertains to the at least one retransmission occasion based on identifying that the one or more TDRA field values within the second SCI message may be associated with the checksum or the hashing function of the identifier associated with the first UE, the first TTI, or both.

In some examples of the method, apparatuses, and non-transitory computer-readable medium described herein, the second SCI message may include operations, features, means, or instructions for identifying that the one or more TDRA field values include an indication of a release of all retransmission occasions associated with the first UE or the second UE identified by the identifier, and identifying that the release pertains to each of the one or more retransmission occasions based on the one or more TDRA field values.

Some examples of the method, apparatuses, and non-transitory computer-readable medium described herein may further include operations, features, means, or instructions for identifying that the release pertains to the at least one retransmission occasion based on the identifier of the at least one retransmission occasion.

Some examples of the method, apparatuses, and non-transitory computer-readable medium described herein may further include operations, features, means, or instructions for determining, based on the one or more TDRA field values being indicative of the release of at least the first subset of the set of resources reserved for the retransmissions of the sidelink transmission, that the one or more TDRA field values may be not indicative of future reservations for retransmissions of a second sidelink transmission associated with the second SCI message.

Some examples of the method, apparatuses, and non-transitory computer-readable medium described herein may further include operations, features, means, or instructions for identifying one or more additional TDRA field values in the second SCI message, where the one or more additional TDRA field values may be indicative of future reservations for retransmissions of a second sidelink transmission associated with the second SCI message.

Some examples of the method, apparatuses, and non-transitory computer-readable medium described herein may further include operations, features, means, or instructions for interpreting one or more FDRA field values in the second SCI message based on the one or more TDRA field value being indicative of the release of at least the first subset of the set of resources reserved for the retransmissions of the sidelink transmission, where the interpretation of the one or more FDRA field values pertains to the release of at least the first subset of the set of resources reserved for the retransmissions of the sidelink transmission.

Some examples of the method, apparatuses, and non-transitory computer-readable medium described herein may further include operations, features, means, or instructions for identifying one or more additional fields within the second SCI message, and identifying that the release pertains to the at least one retransmission occasion of the one or more retransmission occasions based on the one or more TDRA field values, the one or more additional fields within the second SCI message, or both.

In some examples of the method, apparatuses, and non-transitory computer-readable medium described herein, the one or more additional fields within the second SCI message include a first field associated with demodulation reference signals (DMRS), a second field associated with ports used for DMRS, a third field associated with priority of sidelink communications, a fourth field associated with a physical sidelink feedback channel (PSFCH) overhead, a fifth field associated with a FDRA, or any combination thereof.

Some examples of the method, apparatuses, and non-transitory computer-readable medium described herein may further include operations, features, means, or instructions for transmitting the sidelink transmission in accordance with the first SCI message, and receiving, from a second UE, a feedback message indicating that the second UE received the sidelink transmission, where the UE identifies the second SCI message by generating the second SCI message based on the feedback message.

In some examples of the method, apparatuses, and non-transitory computer-readable medium described herein, identifying the second SCI message may include operations, features, means, or instructions for receiving the second SCI message from a second UE.

In some examples of the method, apparatuses, and non-transitory computer-readable medium described herein, the one or more TDRA field values include one or more TRIVs which may be not associated with time resource reservations.

Some examples of the method, apparatuses, and non-transitory computer-readable medium described herein may further include operations, features, means, or instructions for receiving a control message including an indication of a set of TRIVs including a first subset of TRIVs associated with time resource reservations, and a second subset of TRIVs which may be not associated with time resource reservations, where the one or more TDRA field values in the second SCI message include a TRIV from the second subset of TRIVs.

Some examples of the method, apparatuses, and non-transitory computer-readable medium described herein may further include operations, features, means, or instructions for transmitting, via the first SCI message, a first identifier that associates the first SCI message with the first UE, a second UE to which the sidelink transmission was directed, or both, where the second SCI message includes a second identifier that associates the second SCI message with a same UE identified by the first identifier.

In some examples of the method, apparatuses, and non-transitory computer-readable medium described herein, the second SCI message may be identified within the set of resources reserved for retransmissions of the sidelink transmission.

Some examples of the method, apparatuses, and non-transitory computer-readable medium described herein may further include operations, features, means, or instructions for identifying a time period preceding a first retransmission occasion of the one or more retransmission occasions during which at least the first retransmission occasion may be not to be released, where the second SCI message may be identified before a start of the identified time period.

Some examples of the method, apparatuses, and non-transitory computer-readable medium described herein may further include operations, features, means, or instructions for identifying a time period following the transmission of the first SCI message in which the one or more retransmission occasions may be not to be released, where the second SCI message may be identified after an end of the identified time period.

Some examples of the method, apparatuses, and non-transitory computer-readable medium described herein may further include operations, features, means, or instructions for identifying a hybrid automatic repeat request (HARQ) configuration associated with sidelink communications, where identifying the time period following the transmission of the first SCI message may be based on the determined HARQ configuration.

Some examples of the method, apparatuses, and non-transitory computer-readable medium described herein may further include operations, features, means, or instructions for receiving, from a second UE to which the sidelink transmission was directed, a third UE, or both, a second sidelink transmission over a set of resources associated with the at least one retransmission occasion released via the second SCI message, where the second sidelink transmission may be received based on identifying the second SCI message.

In some examples of the method, apparatuses, and non-transitory computer-readable medium described herein, transmitting fewer retransmissions of the sidelink transmission than signaled by the first indication may include operations, features, means, or instructions for refraining from performing any retransmissions of the sidelink transmission.

Some examples of the method, apparatuses, and non-transitory computer-readable medium described herein may further include operations, features, means, or instructions for identifying, based on transmission of the first SCI message, a TTI range for transmission of the second SCI message, a subchannel range for transmission of the second SCI message, or both, where identifying the second SCI message may be based on identifying the TTI range, the subchannel range, or both.

Some examples of the method, apparatuses, and non-transitory computer-readable medium described herein may further include operations, features, means, or instructions for receiving a control message indicating a relationship between the first SCI message and the TTI range, the subchannel range, or both.

Some examples of the method, apparatuses, and non-transitory computer-readable medium described herein may further include operations, features, means, or instructions for identifying a set of candidate resources for transmission of the second SCI message based on receiving the first SCI message, where the set of candidate resources may have a higher priority for being selected for transmission of the second SCI message than for being selected for other sidelink transmissions, and selecting, from the set of candidate resources, a set of resources for transmission of the second SCI message based on the set of candidate resources having the higher priority.

Some examples of the method, apparatuses, and non-transitory computer-readable medium described herein may further include operations, features, means, or instructions for determining a first channel occupancy ratio of a sidelink communication network prior to transmitting the second SCI, and determining a second channel occupancy ratio of the sidelink communication network based on identifying the second SCI providing the release.

In some examples of the method, apparatuses, and non-transitory computer-readable medium described herein, the second SCI message may be transmitted with a designated priority which may be greater than a priority associated with other transmissions.

A method of wireless communication at a second UE is described. The method may include receiving, from a first UE during a first TTI, a first SCI message associated with a sidelink transmission from the first UE to the second UE, where the first SCI message includes a first indication of a set of resources reserved for retransmissions of the sidelink transmission at one or more retransmission occasions, identifying, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and monitoring only a second subset of the set of resources in accordance with the release of the first subset of the set of resources.

An apparatus for wireless communication at a second UE is described. The apparatus may include a processor, memory coupled with the processor, and instructions stored in the memory. The instructions may be executable by the processor to cause the apparatus to receive, from a first UE during a first TTI, a first SCI message associated with a sidelink transmission from the first UE to the second UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and monitor only a second subset of the set of resources in accordance with the release of the first subset of the set of resources.

Another apparatus for wireless communication at a second UE is described. The apparatus may include means for receiving, from a first UE during a first TTI, a first SCI message associated with a sidelink transmission from the first UE to the second UE, where the first SCI message includes a first indication of a set of resources reserved for retransmissions of the sidelink transmission at one or more retransmission occasions, identifying, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and monitoring only a second subset of the set of resources in accordance with the release of the first subset of the set of resources.

A non-transitory computer-readable medium storing code for wireless communication at a second UE is described. The code may include instructions executable by a processor to receive, from a first UE during a first TTI, a first SCI message associated with a sidelink transmission from the first UE to the second UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions, and monitor only a second subset of the set of resources in accordance with the release of the first subset of the set of resources.

Some examples of the method, apparatuses, and non-transitory computer-readable medium described herein may further include operations, features, means, or instructions for identifying that the release pertains to the at least one retransmission occasion based on the identifier of the first SCI message.

Some examples of the method, apparatuses, and non-transitory computer-readable medium described herein may further include operations, features, means, or instructions for identifying one or more SCI message transmissions that may be within a configured TTI range and subchannel range of the second SCI message, identifying, based on the one or more TDRA field values, the first SCI message from the one or more SCI message transmissions, and identifying that the release pertains to the at least one retransmission occasion based on the identification of the first SCI message.

Some examples of the method, apparatuses, and non-transitory computer-readable medium described herein may further include operations, features, means, or instructions for identifying that the one or more TDRA field values may be associated with a checksum or a hashing function of at least a portion of data included within the first SCI message, and identifying that the release pertains to the at least one retransmission occasion based on identifying that the one or more TDRA field values within the second SCI message may be associated with the checksum or the hashing function of at least the portion of data included within the first SCI message.

In some examples of the method, apparatuses, and non-transitory computer-readable medium described herein, the data included within the first SCI message includes a first CRC portion of the first SCI message, a set of TDRA values of the first SCI message, a set of FDRA values of the first SCI message, or any combination thereof.

Some examples of the method, apparatuses, and non-transitory computer-readable medium described herein may further include operations, features, means, or instructions for identifying that the one or more TDRA field values may be associated with a checksum or a hashing function of an identifier associated with the first UE, the first TTI, or both, and identifying that the release pertains to the at least one retransmission occasion based on identifying that the one or more TDRA field values within the second SCI message may be associated with the checksum or the hashing function of the identifier associated with the first UE, the first TTI, or both.

In some examples of the method, apparatuses, and non-transitory computer-readable medium described herein, the second SCI message may include operations, features, means, or instructions for identifying that the one or more TDRA field values include an indication of a release of all retransmission occasions associated with the first UE or the second UE identified by the identifier, and identifying that the release pertains to each of the one or more retransmission occasions based on the one or more TDRA field values.

Some examples of the method, apparatuses, and non-transitory computer-readable medium described herein may further include operations, features, means, or instructions for identifying that the release pertains to the at least one retransmission occasion based on the identifier of the at least one retransmission occasion.

Some examples of the method, apparatuses, and non-transitory computer-readable medium described herein may further include operations, features, means, or instructions for determining, based on the one or more TDRA field values being indicative of the release of at least the first subset of the set of resources reserved for the retransmissions of the sidelink transmission, that the one or more TDRA field values may be not indicative of future reservations for retransmissions of a second sidelink transmission associated with the second SCI message.

Some examples of the method, apparatuses, and non-transitory computer-readable medium described herein may further include operations, features, means, or instructions for identifying one or more additional TDRA field values in the second SCI message, where the one or more additional TDRA field values may be indicative of future reservations for retransmissions of a second sidelink transmission associated with the second SCI message.

Some examples of the method, apparatuses, and non-transitory computer-readable medium described herein may further include operations, features, means, or instructions for interpreting one or more FDRA field values in the second SCI message based on the one or more TDRA field value being indicative of the release of at least the first subset of the set of resources reserved for the retransmissions of the sidelink transmission, where the interpretation of the one or more FDRA field values pertains to the release of at least the first subset of the set of resources reserved for the retransmissions of the sidelink transmission.

Some examples of the method, apparatuses, and non-transitory computer-readable medium described herein may further include operations, features, means, or instructions for identifying one or more additional fields within the second SCI message, and identifying that the release pertains to the at least one retransmission occasion of the one or more retransmission occasions based on the one or more TDRA field values, the one or more additional fields within the second SCI message, or both.

In some examples of the method, apparatuses, and non-transitory computer-readable medium described herein, the one or more additional fields within the second SCI message include a first field associated with DMRS, a second field associated with ports used for DMRS, a third field associated with priority of sidelink communications, a fourth field associated with a PSFCH overhead, a fifth field associated with a FDRA, or any combination thereof.

Some examples of the method, apparatuses, and non-transitory computer-readable medium described herein may further include operations, features, means, or instructions for receiving the sidelink transmission from the first UE in accordance with the first SCI message, and transmitting, to the first UE, a feedback message indicating receipt of the sidelink transmission, where the UE identifies the second SCI message by receiving the second SCI message based on the feedback message.

In some examples of the method, apparatuses, and non-transitory computer-readable medium described herein, identifying the second SCI message may include operations, features, means, or instructions for transmitting the second SCI message to the first UE.

In some examples of the method, apparatuses, and non-transitory computer-readable medium described herein, the one or more TDRA field values include one or more TRIVs which may be not associated with time resource reservations.

Some examples of the method, apparatuses, and non-transitory computer-readable medium described herein may further include operations, features, means, or instructions for receiving a control message including an indication of a set of TRIVs including a first subset of TRIVs associated with time resource reservations, and a second subset of TRIVs which may be not associated with time resource reservations, where the one or more TDRA field values in the second SCI message include a TRIV from the second subset of TRIVs.

Some examples of the method, apparatuses, and non-transitory computer-readable medium described herein may further include operations, features, means, or instructions for receiving, via the first SCI message, a first identifier that associates the first SCI message with the first UE, the second UE, or both, where the second SCI message includes a second identifier that associates the second SCI message with a same UE identified by the first identifier.

In some examples of the method, apparatuses, and non-transitory computer-readable medium described herein, the second SCI message may be identified within the set of resources reserved for retransmissions of the sidelink transmission.

Some examples of the method, apparatuses, and non-transitory computer-readable medium described herein may further include operations, features, means, or instructions for identifying a time period preceding a first retransmission occasion of the one or more retransmission occasions during which at least the first retransmission occasion may be not to be released, where the second SCI message may be identified before a start of the identified time period.

Some examples of the method, apparatuses, and non-transitory computer-readable medium described herein may further include operations, features, means, or instructions for identifying a time period following the transmission of the first SCI message in which the one or more retransmission occasions may be not to be released, where the second SCI message may be identified after an end of the identified time period.

Some examples of the method, apparatuses, and non-transitory computer-readable medium described herein may further include operations, features, means, or instructions for identifying a HARQ configuration associated with sidelink communications, where identifying the time period following the transmission of the first SCI message may be based on the determined HARQ configuration.

Some examples of the method, apparatuses, and non-transitory computer-readable medium described herein may further include operations, features, means, or instructions for transmitting, to the first UE, a third UE, or both, a second sidelink transmission over a set of resources associated with the at least one retransmission occasion released via the second SCI message, where the second sidelink transmission may be transmitted based on identifying the second SCI message.

In some examples of the method, apparatuses, and non-transitory computer-readable medium described herein, monitoring fewer retransmission occasions of the one or more retransmission occasions associated with the sidelink transmission than signaled by the first indication may include operations, features, means, or instructions for refraining from monitoring any retransmission occasions of the one or more retransmission occasions.

Some examples of the method, apparatuses, and non-transitory computer-readable medium described herein may further include operations, features, means, or instructions for identifying, based on reception of the first SCI message, a TTI range for transmission of the second SCI message, a subchannel range for transmission of the second SCI message, or both, where identifying the second SCI message may be based on identifying the TTI range, the subchannel range, or both.

Some examples of the method, apparatuses, and non-transitory computer-readable medium described herein may further include operations, features, means, or instructions for receiving a control message indicating a relationship between the first SCI message and the TTI range, the subchannel range, or both.

Some examples of the method, apparatuses, and non-transitory computer-readable medium described herein may further include operations, features, means, or instructions for identifying a set of candidate resources for transmission of the second SCI message based on receiving the first SCI message, where the set of candidate resources may have a higher priority for being selected for transmission of the second SCI message than for being selected for other sidelink transmission messages, and selecting a set of resources for transmission of a second sidelink transmission based on the set of candidate resources having the higher priority.

Some examples of the method, apparatuses, and non-transitory computer-readable medium described herein may further include operations, features, means, or instructions for identifying a set of candidate resources for transmission of the second SCI message based on receiving the first SCI message, where the set of candidate resources may have a lower priority for being selected for transmission of other sidelink transmission messages than for being selected for transmission of the second SCI message, and refraining from selecting a set of resources from the set of candidate resources for transmission of the other sidelink transmission messages based on the set of candidate resources having the lower priority.

Some examples of the method, apparatuses, and non-transitory computer-readable medium described herein may further include operations, features, means, or instructions for determining a first channel occupancy ratio of a sidelink communication network prior to transmitting the second SCI, and determining a second channel occupancy ratio of the sidelink communication network based on identifying the second SCI providing the release.

In some examples of the method, apparatuses, and non-transitory computer-readable medium described herein, the second SCI message may be transmitted with a designated priority which may be greater than a priority associated with other transmissions.

DETAILED DESCRIPTION

Figure 1:
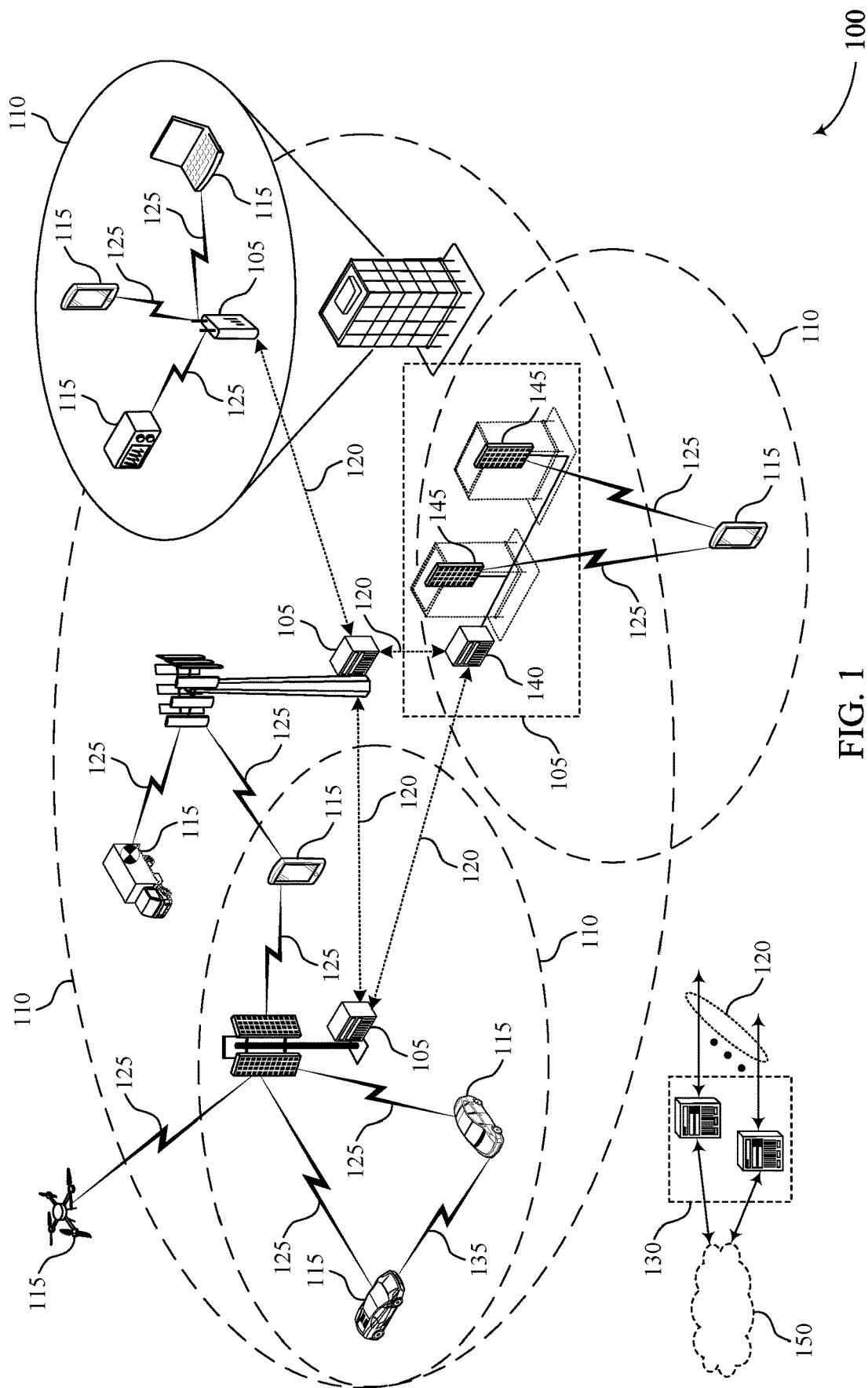
FIG. 1 illustrates an example of a wireless communications system that supports techniques for sidelink resource cancellation using time resource indicator values (TRIVs) in accordance with aspects of the present disclosure.

In some wireless communications systems, a user equipment (UE) may reserve resources to communicate on a wireless channel. For example, in a vehicle-to-everything (V2X) wireless communications system, a UE may reserve resources on a sidelink channel to send an initial transmission and, in some cases, one or more retransmissions of the initial transmission. The UE may transmit a first sidelink control information (SCI) message on the sidelink channel to reserve one or more resources on the sidelink channel. For example, the SCI message may reserve a first sidelink resource for an initial transmission and one or more additional sidelink resources for retransmissions. The SCI message may include indicators of the resource allocations for the retransmissions, such that a receiving device may monitor for the retransmissions at the corresponding resources. In some cases, a UE may reserve one or more additional resources for retransmissions, but the receiving device may successfully obtain the initial transmission. In this example, the UE may still have reserved the resources, but the UE may not use the reserved resources for retransmitting. In some wireless communications systems, these resources may not be used, reducing a spectral efficiency and resource utilization on the wireless communications channel.

To enable more efficient use of sidelink communications resources, techniques for sidelink resource release are described. In particular, SCI messages may include one or more time domain resource allocation (TDRA) field values which indicate resources that were previously-reserved for retransmissions of a sidelink transmission that are to be released. For example, a first UE may transmit a first SCI message which reserves resources for a sidelink transmission. In some cases, the reserved resources may include resources within the same slot as the first SCI message for an initial sidelink transmission, as well as resources in subsequent slots for retransmissions of the sidelink transmission at one or more retransmission occasions. In cases where a first transmission of the sidelink transmission is successfully received by a second UE, the first UE (which transmitted the first SCI message) and/or the second UE may transmit a second SCI message which includes one or more TDRA field values which indicate which previously-reserved resources are to be released. In some aspects, the one or more TDRA field values within the second SCI message which are used to indicate which previously-reserved resources are to be released may include time resource indicator values (TRIVs) which are not associated with reservations of time resources (e.g., "unspecified" TRIVs).

Aspects of the disclosure are initially described in the context of wireless communications systems. Aspects of the disclosure are further illustrated by and described with reference to apparatus diagrams, system diagrams, and flowcharts that relate to techniques for sidelink resource release/cancellation using SCI messages.

FIG. 1 illustrates an example of a wireless communications system 100 that supports techniques for sidelink resource cancellation using TRIVs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 of the wireless communications system 100 may support techniques for sidelink resource cancellation (e.g., sidelink resource release). In particular, the UEs 115 of the wireless communications system 100 may be configured to release sidelink resources which were previously reserved for sidelink transmissions via SCI messages via the use of TDRA field values. By enabling sidelink resources which were previously reserved for sidelink transmissions to be subsequently canceled or released, techniques described herein may provide for more efficient use of sidelink resources and improved spectral efficiency.

For example, a first UE 115 of the wireless communications system 100 may transmit a first SCI message to a second UE 115 which reserves resources for a sidelink transmission from the first UE 115 to the second UE 115. In some cases, the reserved sidelink resources may include resources within the same slot as the first SCI message for an initial sidelink transmission, as well as resources in subsequent slots for retransmissions of the sidelink transmission at one or more retransmission occasions. In cases where a first transmission of the sidelink transmission is not successfully received by the second UE 115, the previously-reserved sidelink resources may be used to perform retransmissions of the sidelink transmission. However, in cases where the first transmission of the sidelink transmission is successfully received by the second UE 115, the previously-reserved sidelink resources may not be needed for retransmissions. In such cases, the first UE 115 and/or the second UE 115 may transmit a second SCI message which may be interpreted as releasing the sidelink resources which were reserved by the first SCI message.

In some cases, the second SCI message may have a same format as the first SCI message (e.g., SCI1, SCI2). In other cases, the first SCI message and the second SCI message have different formats. In some aspects, the second SCI message indicating the release of the previously-reserved sidelink resources may include one or more TDRA field values which indicate which previously-reserved resources are to be released. For example, the second SCI message may include one or more TDRA field values which indicate at least one retransmission occasion of the one or more retransmission occasions reserved by the first SCI message is to be released. The one or more TDRA field values within the second SCI message which are used to indicate additional sidelink resource reservations may include TRIVs which are not associated with reservations of time resources (e.g., "unspecified" TRIVs).

The techniques described herein may provide for more efficient use of sidelink resources and improved spectral efficiency. In particular, by enabling UEs 115 to cancel (e.g., release) sidelink resources which were previously-reserved for sidelink transmissions, the techniques described herein may reduce a quantity of wasted sidelink resources which may be unused in the case of successful sidelink transmissions, thereby leading to more efficient use of the sidelink resources within the wireless communications system 100.

Figure 2:
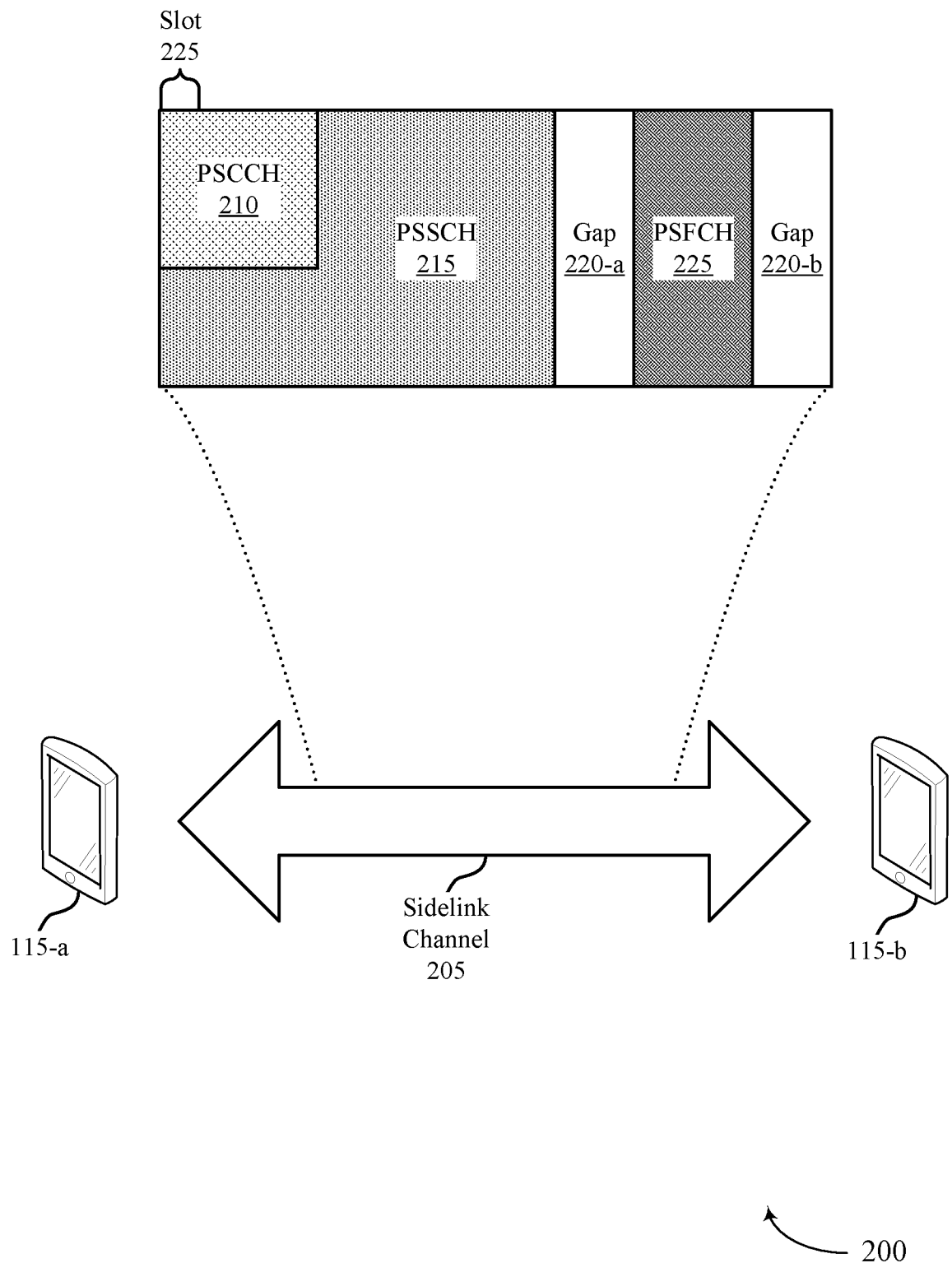
FIG. 2 illustrates an example of a wireless communications system that supports techniques for sidelink resource cancellation using TRIVs in accordance with aspects of the present disclosure.

FIG. 2 illustrates an example of a wireless communications system 200 that supports techniques for sidelink resource cancellation using TRIVs in accordance with aspects of the present disclosure. In some examples, wireless communications system 200 may implement aspects of wireless communications system 100. In some examples, wireless communications system 200 may implement, or be implemented by, aspects of wireless communications system 100. The wireless communications system 200 may include UE 115-a and UE 115-b, which may each be an example of a UE 115 described with reference to FIG. 1.

In some cases, the wireless communications system 200 may be an example of a V2X wireless communications system. UE 115-a or UE 115-b, or both, may be an example of a vehicular UE 115 (V-UE), a pedestrian UE 115 (P-UE), a roadside unit, a transmission/reception point (TRP), or another device operating in a V2X wireless communications system. In some cases, the UEs 115 may be served by one or more base stations 105, one or more roadside units, or any combination thereof.

The UE 115-a and the UE 115-b may communicate directly on a wireless channel of the wireless communications system. For example, UE 115-a and UE 115-b may communicate on a sidelink channel 205. In some cases, the sidelink channel 205 may include resources for a physical sidelink control channel (PSCCH 210), a physical sidelink shared channel (PSSCH 215), one or more gaps 220 (e.g., gap 220-a and gap 220-b), and a physical sidelink feedback channel (PSFCH 225). In some cases, the PSFCH 225 may be positioned between gap 220-a and gap 220-b (e.g., in the time domain). The sidelink channel 205 may span a number of subcarriers. For example, the sidelink channel 205 may span up to 27 subchannels, each subchannel including ten or more resource blocks. In other examples, the sidelink channel 205 may include more, or fewer, subchannels, and the number of resource blocks per subchannel may similarly be different in other examples.

To transmit sidelink transmissions to the UE 115-b, the UE 115-a may reserve resources on the sidelink channel 205. In some cases, UE 115-a may determine the resource allocation. For example, UE 115-a may autonomously decide resources for sidelink communications. In some other examples, a base station 105 may configure the resource allocations for UE 115-a. For example, the base station 105 may assign transmit resources for sidelink resources through downlink control information (DCI).

In an example, UE 115-a may transmit a first SCI message on the PSCCH 210 to reserve one or more resources for a sidelink data transmission. In some cases, UE 115-a may send the SCI message in a first slot of the PSCCH 210. The first slot may include a sidelink shared channel resource for the sidelink data transmission. In some cases, the UE 115-a may reserve one or more additional resources (e.g., slots on the sidelink channel 205) for retransmissions of the sidelink data transmission. For example, the first SCI message may reserve two additional slots on the PSSCH 215.

The first SCI message may include an example of a first type of SCI message (e.g., SCI1). The first type of SCI message may be decoded by all UEs 115 using the sidelink channel 205 to detect the reserved resources and avoid collisions. The first type of SCI message may include an indication of a priority of the traffic, an indication of a demodulation reference signal (DMRS) pattern, an indication of TDRA field values, an indication of frequency domain resource allocation (FDRA) field values, an indication of a resource reservation period, or any combination thereof. The indication of the priority of the traffic may be, for example, three bits. In some cases, the first type of SCI message may include a format for a second type of SCI message (e.g., SCI2), a beta offset of rate matching the second type of SCI message, an indication of DMRS ports, an indication of a modulation and coding scheme (MCS), an MCS table, a PSFCH overhead indicator, and a number of reserved bits, or any combination thereof.

The FDRA indication and the TDRA indication may include a number of bits based on a number of slot reservations and a number of subchannels of the reserved resources. For example, the TDRA indication may include five bits for two reservations or nine bits for three reservations. A TRIV in the first SCI message may indicate the TDRA for retransmission resources. For example, the TRIV in the first type of SCI message may include nine bits for three reservations, including the first slot (t0) with the first SCI message and initial transmission, a second slot (t1) for a first retransmission resource and a third slot (t3) for a second retransmission resource. In some cases, the TRIV may be determined based on t1 being between 1 and 30 inclusive, and t2 being greater than t1 and less than or equal to 31. For one transmission (e.g., with no reserved retransmission resource), the TRIV may be set to 0. For two transmissions (e.g., one reserved retransmission resource), the TRIV may be set to a value in {1, ... , 31}. For three transmissions (e.g., two reserved retransmission resources), the TRIV may be set to a value in {32, ... , 496}. In some wireless communications systems, the remaining values, {497, ... , 511} may not be specified. In some implementations, UE 115-a may use one of these remaining values (e.g., TRIV {497, ... , 511}) for special purposes. For example, the techniques described herein may utilize unspecified TRIVs within SCI messages to indicate a release of sidelink resources which were previously reserved. In this regard, techniques described herein may utilize unspecified TRIVs within SCI messages to indicate at least one previously-reserved retransmission occasion which is to be released.

The first type of SCI messages may be decoded by any receivers using the sidelink channel 205, including the intended receiver and other sidelink UEs 115, to allow channel sensing and avoid resource collision. To receive the sidelink data transmission, UE 115-b may perform blind decoding on sidelink subchannels of the sidelink channel 205 to receive the first SCI message. The UE 115-b may identify the reserved resources based on the TDRA indications and FDRA indications and attempt to decode the sidelink data transmission. In some cases, UE 115-b may not successfully obtain the sidelink data transmission. In such cases, the UE 115-a may retransmit the sidelink data transmission at the resources reserved for retransmission. The UE 115-b may monitor the resources reserved for the retransmission and attempt to receive the retransmitted sidelink data. After the UE 115-b successfully obtains the sidelink data, the UE 115-b may transmit an acknowledgment (ACK) to UE 115-a (e.g., on the PSFCH 225).

In some cases, UE 115-b may successfully receive the sidelink data from the initial transmission. However, UE 115-a may have already reserved the one or more retransmission resources via the first SCI message. In some wireless communications systems, these resources may be unused, which reduces channel utilization and spectral efficiency. Accordingly, wireless communications systems described herein, such as the wireless communications systems 100 and 200, may implement techniques to efficiently release previously-reserved resources in order to improve resource utilization.

For example, if UE 115-b successfully receives the sidelink data before one or more retransmission resources, the unused retransmission resources may be released. For example, the UE 115-a and/or UE 115-b may cancel/release the previously-reserved sidelink resources such that other UEs 115 may reserve and use the resources. In some cases, the UE 115-a and/or UE 115-b may transmit a second SCI message including one or more TDRA field values which indicate that the previously-reserved sidelink resources are to be released.

The techniques described herein may provide for more efficient use of sidelink resources and improved spectral efficiency. In particular, by enabling the UE 115-a and/or UE 115-b to cancel (e.g., release) sidelink resources which were previously-reserved for sidelink transmissions, the techniques described herein may reduce a quantity of wasted sidelink resources which may be unused in the case of successful sidelink transmissions, thereby leading to more efficient use of the sidelink resources within the wireless communications system 200.

Figure 3:
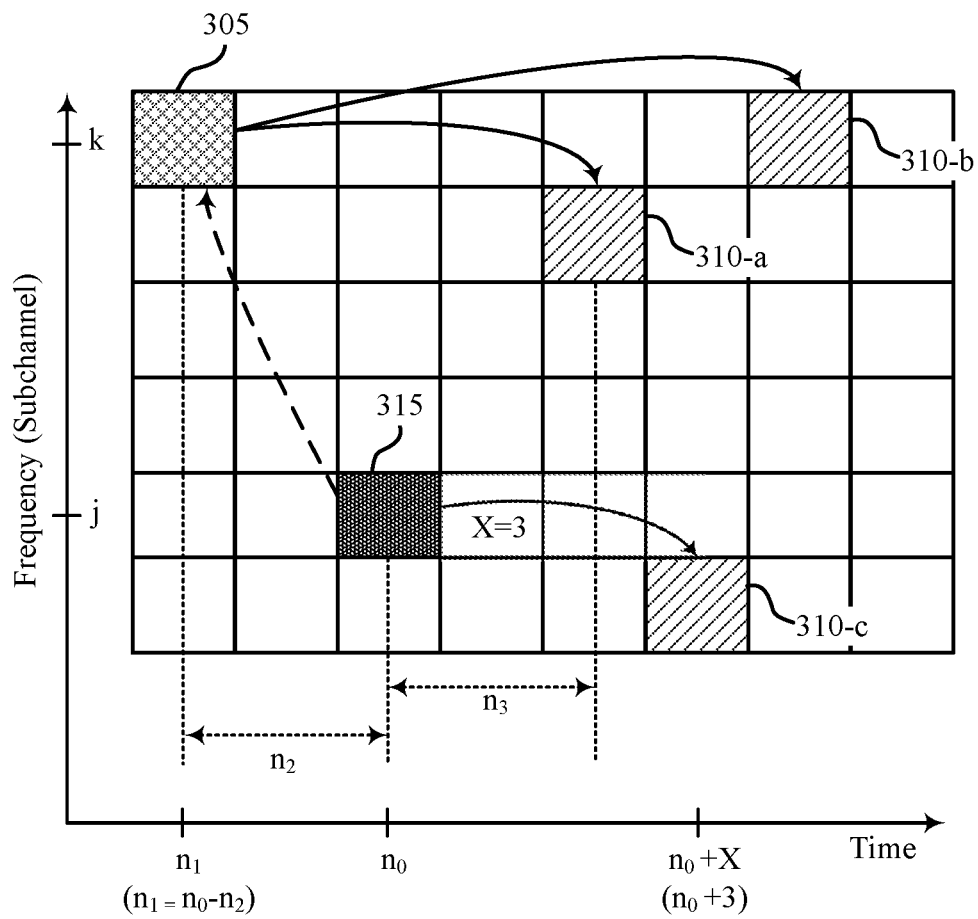
FIG. 3 illustrates an example of a resource reservation scheme that supports techniques for sidelink resource cancellation using TRIVs in accordance with aspects of the present disclosure.

FIG. 3 illustrates an example of a resource reservation scheme 300 that supports techniques for sidelink resource cancellation using TRIVs in accordance with aspects of the present disclosure. In some examples, resource reservation scheme 300 may implement, or be implemented by, aspects of wireless communication system 100, wireless communications system 200, or both.

A first UE 115 may schedule sidelink transmissions to a second UE 115 on a wireless channel. To send the sidelink transmission, the first UE 115 may reserve an initial sidelink resource 305. The first UE 115 may transmit a first SCI message and an initial transmission of sidelink data using the initial sidelink resource 305. The first SCI message may also reserve one or more retransmission sidelink resources 310 (e.g., retransmission occasions) for retransmissions of the sidelink data. For example, the first SCI may indicate retransmission sidelink resource 310-a (e.g., first retransmission occasion) and retransmission sidelink resource 310-b (e.g., second retransmission occasion). If the second UE 115 does not receive the initial transmission, the first UE 115 may use the retransmission sidelink resources 310 to retransmit the sidelink data (e.g., sidelink transmission).

In some cases, the second UE 115 may successfully receive the sidelink data from the initial transmission on the initial sidelink resource 305. In such cases, the retransmission sidelink resources 310 may still be reserved for retransmissions despite the retransmission sidelink resources 310 being unnecessary for retransmissions due to the successful transmission and reception of the sidelink data (e.g., sidelink transmission) via the initial sidelink resource 305. Accordingly, to improve efficient use of sidelink resources, techniques described herein support the release of previously-reserved resources (e.g., retransmission sidelink resources 310) via SCI messages. In particular, techniques described herein are directed to the use of TDRA field values within releasing/cancelling SCI messages to indicate which previously-reserved retransmission sidelink resources 310 are to be released.

For example, as described previously herein, the first UE 115 may transmit a first SCI message to the second UE 115 via the initial sidelink resource 305. In some cases, the first SCI message may be associated with (e.g., schedule) a first sidelink transmission from the first UE 115 to the second UE 115. In some aspects, the first SCI message indicates a first set of resources reserved for retransmissions of the first sidelink transmission at one or more retransmission occasions. For instance, the first SCI message may reserve retransmission sidelink resources 310-b and 310-c for retransmissions of the first sidelink transmission. In some cases (e.g., in cases where the first sidelink transmission is successfully received by the second UE 115), the first UE 115 and/or the second UE 115 may transmit a second SCI message on a sidelink resource 315 to cancel or release at least a subset of the previously-reserved sidelink resources (e.g., cancel or release retransmission sidelink resource 310-a and/or 310-b).

For instance, the second SCI message may provide a release of the retransmission sidelink resource 310-a and/or retransmission sidelink resource 310-b. Moreover, the second SCI message transmitted via the sidelink resource 315 may include one or more TDRA field values which indicate that the retransmission sidelink resource 310-a, the retransmission sidelink resource 310-b, or both, is to be released.

For instance, the second SCI message transmitted via sidelink resource 315 may include one or more TDRA field values indicating that the retransmission sidelink resource 310-a, the retransmission sidelink resource 310-b, or both, is to be released. In some aspects, the one or more TDRA field values used to indicate which previously-reserved resources are to be released may include one or more TRIVs which are not associated with time resource reservations. In this regard, the one or more TDRA field values indicating which resources are to be released may include unspecified TRIVs. For instance, as noted previously herein, some wireless communications systems may support TRIVs from 0 to 511 (e.g., {0, . . . , 511}), where TRIVs from 0 to 496 (e.g., {0, . . . , 496}) are used to indicate reservations of time resources, which leaves TRIVs from 497 to 511 (e.g., {497, . . . , 511}) which are not used to indicate reservations of time resources. Accordingly, in some aspects, techniques described herein may utilize the unspecified TRIVs (e.g., {497, . . . , 511}) within the second SCI message to indicate which previously-reserved resources (e.g., retransmission sidelink resource 310-a and/or 310-b) are to be released.

In some cases, the first SCI message and the second SCI message may each be a first type of SCI message (e.g., having a common format, such as SCI1, SCI2, or both). In some other examples, the first SCI message may be an example of the first type of SCI (e.g., SCI1), and the second SCI message may be an example of a second type of SCI (e.g., SCI2), or vice versa.

In some cases, the sidelink resource 315 carrying the second, or cancelling, SCI message may be selected to facilitate the resource cancellation or release. For example, the sidelink resource 315 may correspond to slot $n_0$ and subcarrier j. The released resources may have been reserved by the first SCI message transmitted in slot $n_1$ and subchannel k, occupying $M_1$ subchannels. Additionally or alternatively, the sidelink resource 315 may be associated with a configured relationship (e.g., RRC configured relationship) relative to initial sidelink resource 305. In some cases, the earliest retransmission sidelink resource 310-a and/or 310-b released by the second SCI message transmitted via sidelink resource 315 may be at $n_0+n_3$, where $n_3$ may be a number of slots based on a PSSCH preparation time. For example, the second SCI message may be transmitted at least $n_3$ slots prior to the released retransmission sidelink resource 310-a and/or 310-b, which may ensure that other UEs 115 using the sidelink channel can process PSSCH and use the resource. In some cases, the sidelink resource 315 may be at least $n_2$ slots after the initial sidelink resource 305. The number of slots $n_2$ may be based on a feedback timing (e.g., HARQ configuration) for the first UE 115, the second UE 115, or both. For example, $n_2$ may be a number of slots for the second UE 115 to determine the initial sidelink data transmission was successfully received, transmit feedback (e.g., an acknowledgment), and for the first UE 115 to receive the feedback.

In some aspects, the second SCI message transmitted via sidelink resource 315 may include an indication (e.g., via TDRA field values, FDRA field values, DMRS fields, DMRS port fields, sidelink priority fields, PSFCH overhead fields) a second set of resources reserved for retransmissions of a second sidelink transmission. For instance, as shown in FIG. 3, the second SCI message may include an indication of a retransmission sidelink resource 310-c which is reserved for retransmissions of a second sidelink transmission. In particular, the retransmission sidelink resource 310-c reserved by the second SCI message may be reserved for retransmissions of the second SCI message itself, a second sidelink data transmission (e.g., PSSCH transmission), or both.

Figure 4:
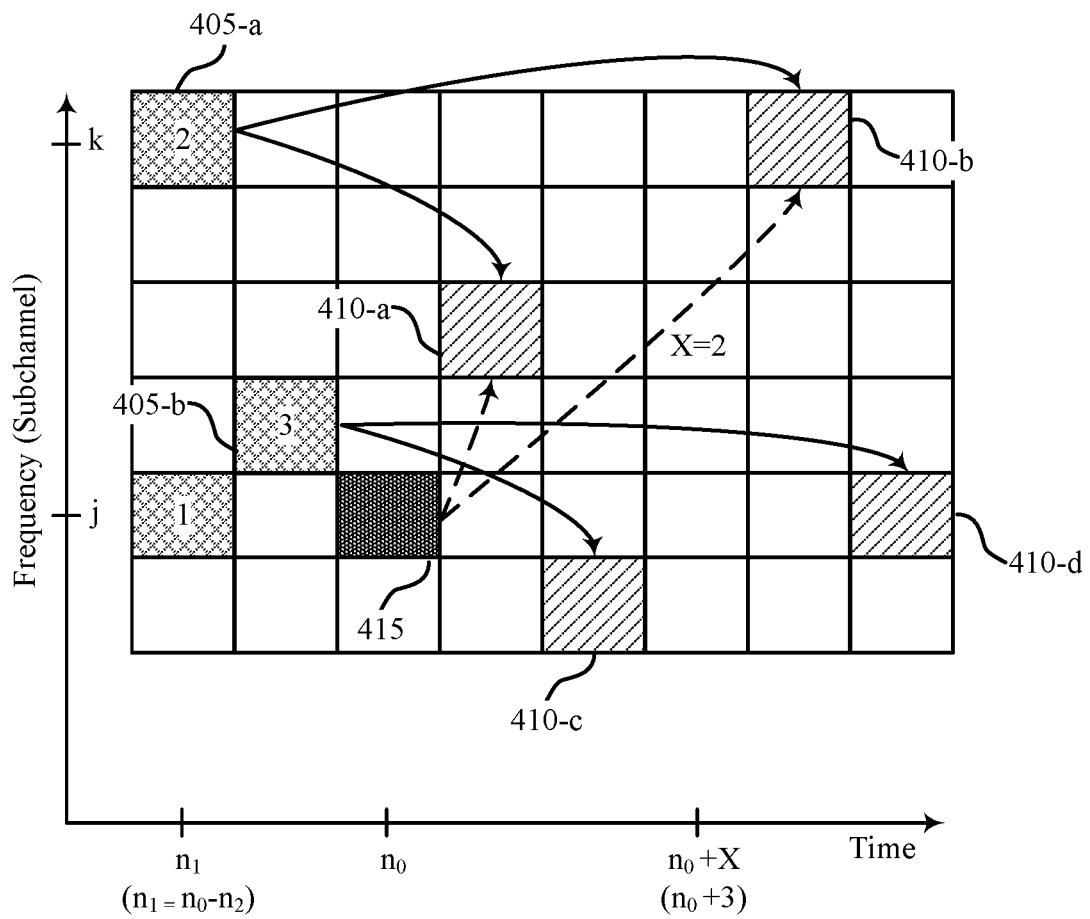
FIG. 4 illustrates an example of a resource reservation scheme that supports techniques for sidelink resource cancellation using TRIVs in accordance with aspects of the present disclosure.

FIG. 4 illustrates an example of a resource reservation scheme 400 that supports techniques for sidelink resource cancellation using TRIVs in accordance with aspects of the present disclosure. In some examples, resource reservation scheme 400 may implement, or be implemented by, aspects of wireless communications system 100, wireless communications system 200, resource reservation scheme 300, or any combination thereof.

A first UE 115 may schedule sidelink transmissions to a second UE 115 on a wireless channel. To send the sidelink transmission, the first UE 115 may reserve an initial sidelink resource 405 (e.g., initial sidelink resource 405-a). The first UE 115 may transmit a first SCI message and an initial transmission of sidelink data using the initial sidelink resource 405-a. The first SCI message may also reserve one or more retransmission sidelink resources 410 for retransmissions of the sidelink data. For instance, as shown in FIG. 4, the first SCI message transmitted via initial sidelink resource 405-a may indicate retransmission sidelink resource 410-a and retransmission sidelink resource 410-b. If the second UE 115 does not receive the initial sidelink transmission associated with the first SCI message transmitted via the initial sidelink resource 405-a, the first UE 115 may use the retransmission sidelink resources 410-a and 410-b to retransmit the sidelink transmission. Conversely, if the first sidelink transmission is successfully received by the second UE 115, a second SCI message transmitted via sidelink resource 415 may be used to cancel or release the retransmission sidelink resources 410-a and/or 410-b.

In some cases, a sidelink channel may include multiple SCI messages which schedule sidelink transmissions over the sidelink channel. For example, as shown in FIG. 4, an SCI message transmitted via initial sidelink resource 405-a may reserve retransmission sidelink resources 410-a and 410-b, and an SCI message transmitted via initial sidelink resource 405-b may reserve retransmission sidelink resources 410-c and 410-d. In such cases, UEs 115 which identify the second SCI message transmitted via sidelink resources 415 may be configured to determine whether the second SCI message is associated with the SCI message transmitted via initial sidelink resource 405-a, or the SCI message transmitted via initial sidelink resource 405-b. In other words, UEs 115 may be configured to determine whether the SCI message transmitted via sidelink resources 415 is associated with a release of the retransmission sidelink resources 410-a and/or 410-b, or the retransmission sidelink resources 410-c and 410-d.

In some aspects, UEs 115 may be configured to determine that the second SCI message is associated with a release of resources reserved by the first SCI message (e.g., SCI message transmitted via initial sidelink resource 405-a), as opposed to other SCI messages, based on one or more TDRA field values and/or one or more additional fields (e.g., FDRA field values) within the second SCI message. In this regard, the one or more TDRA field values (and additional field values) within the second SCI message may be used to indicate that the release of sidelink resources provided by the second SCI message is associated with resources reserved by the first SCI message transmitted via the initial sidelink resource 405-a as opposed to other SCI messages transmitted via initial sidelink resources 405-b and/or 405-c.

For example, in some cases, the one or more TDRA field values within the second SCI message may include an indication of the first SCI message transmitted via the initial sidelink resource 405-a, and may thereby indicate a release of the retransmission sidelink resources 410-a and/or 410-b. Additionally or alternatively, the one or more TDRA field values may include an indication of the retransmission sidelink resources 410-a and/or 410-b themselves. In some cases, UEs 115 may be configured to determine that the second SCI message transmitted via sidelink resource 415 is associated with the first SCI message transmitted via initial sidelink resource 405-a (as opposed to other SCI messages transmitted via initial sidelink resources 405-b and/or 405-c) based on identifying that the first SCI message (e.g., initial sidelink resource 405-a) is positioned within a configured TTI and/or configured subchannel range relative to the sidelink resource 415.

Figure 5:
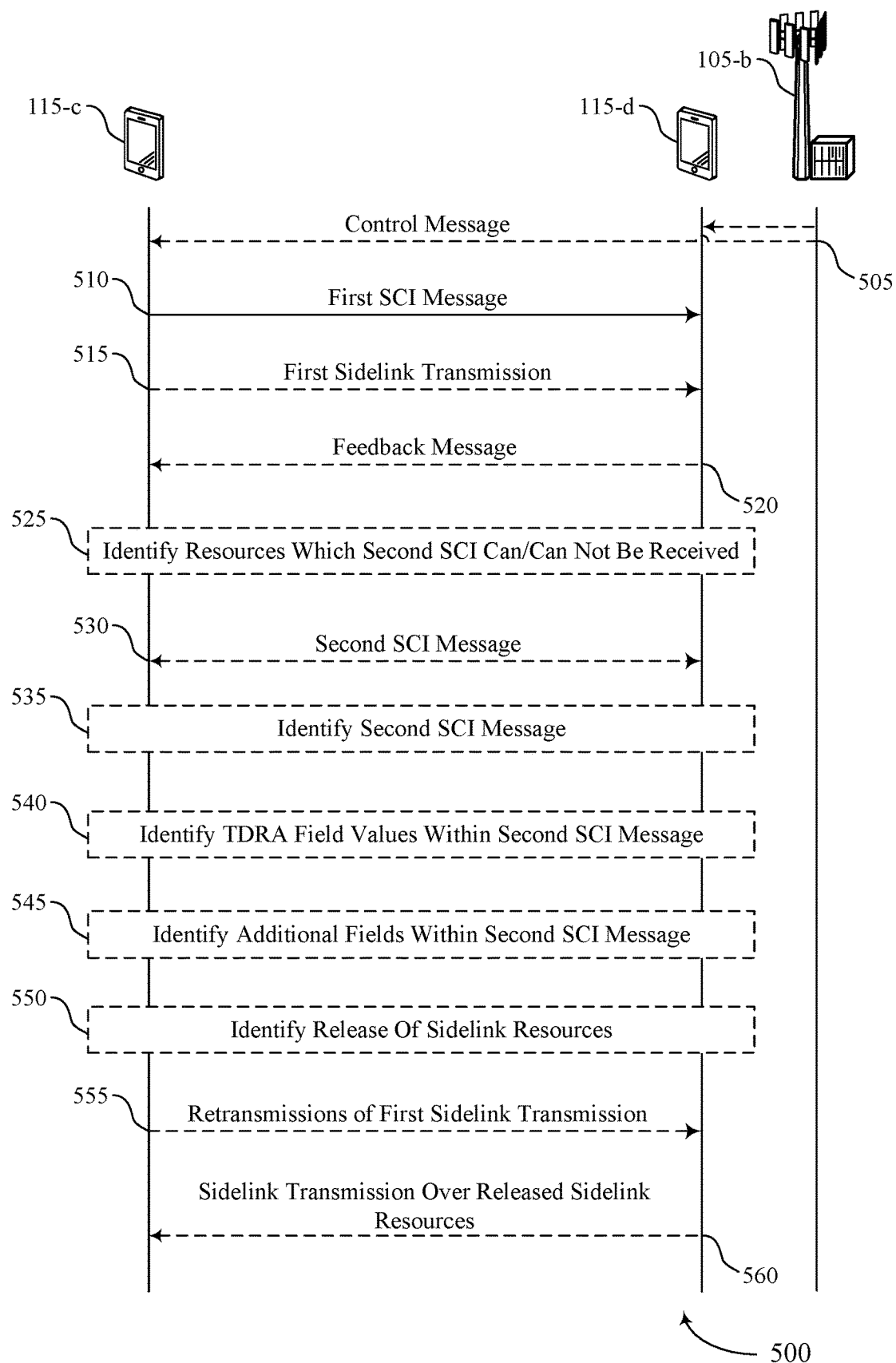
FIG. 5 illustrates an example of a process flow that supports techniques for sidelink resource cancellation using TRIVs in accordance with aspects of the present disclosure.

Techniques for indicating which retransmission sidelink resources 410 are released/canceled by the second SCI message (e.g., TDRA field values within the second SCI message) are described in further detail with respect to FIG. 5.

FIG. 5 illustrates an example of a process flow 500 that supports techniques for sidelink resource cancellation using TRIVs in accordance with aspects of the present disclosure. In some examples, process flow 500 may implement aspects of wireless communications system 100, wireless communications system 200, resource reservation scheme 300, resource reservation scheme 300, or any combination thereof. For example, the process flow 500 may illustrate a first UE 115-c transmitting a first SCI message which reserves a first set of resources for retransmissions of a first sidelink transmission, and identifying a second SCI message associated with a release of at least a subset of the first set of resources, as described with reference to FIGS. 1-4, among other aspects. The process flow 500 may include a first UE 115-c, a second UE 115-d, and a base station 105-b, which may be examples of UEs 115 and base stations 105, as described with reference to FIGS. 1-4.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the first UE 115-c, the second UE 115-d, or both, may receive a control message (e.g., RRC message, DCI message). In some aspects, the UEs 115-c and/or 115-d may receive the control message from the base station 105-b. In some aspects, the control message may indicate a relationship between a second SCI message which is associated with a release of previously-reserved resources and a first SCI message which reserved the resources, a relationship between a second SCI message which is associated with the release and the released resources themselves, configured intervals or ranges of resources in which the second SCI message may be received, or any combination thereof.

For example, as illustrated in FIG. 3, the control message may indicate a TTI range, a subchannel range, or both, associated with releasing/cancellation SCI messages. In this regard, the control message may be used to determine that previously-reserved resources reserved by SCI messages within the TTI range and/or subchannel ranges of releasing/cancelling SCI messages are to be released. By way of another example, the first SCI message may indicate a TTI range for transmission of the second SCI message, a sub- channel range for transmission of the second SCI message, or both. In this example, the TTI range and/or the subchannel range may be defined relative to time/frequency resources associated with the first SCI message, time/frequency resources associated with the resources which are to be released, or both. In this regard, the control message may indicate a relationship between the first SCI message and the TTI range for transmission of the second SCI message, a subchannel range for transmission of the second SCI message, or both.

In some aspects, the control message received at 505 may additionally or alternatively indicate a set of TRIVs. For example, the control message may include an indication of a set of TRIVs (e.g., TRIVs {0, . . . , 511}) which includes a first subset of TRIVs associated with time resource reservations (e.g., TRIVs {0, . . . , 496}), and a second subset of TRIVs which are not associated with time resource reservations (e.g., TRIVs {497, . . . , 511}). In this regard, the base station 105-b may indicate to the UEs 115-c and 115-d which TRIVs are used for time resource reservations (e.g., which TRIVs are specified) and which TRIVs are not used for time resource reservations (e.g., which TRIVs are not specified). Alternatively, the UE may determine which TRIVs are specified and which TRIVs are not specified by pre-configuration (e.g., by number of bits for TDRA and number of allowed reservations).

At 510, the first UE 115-c may transmit a first SCI message to the second UE 115-d. The first SCI message may be transmitted during a first TTI (e.g., first slot). In some aspects, the first SCI message may be associated with a first sidelink transmission (e.g., PSSCH transmission) from the first UE 115-c to the second UE 115-d. In some aspects, the first SCI message may include a first indication of a first set of resources reserved for retransmissions of the first sidelink transmission at one or more retransmission occasions.

For example, as shown in FIG. 3, the first UE 115-c may transmit a first SCI message via initial sidelink resource 305 during a first TTI (e.g., first slot), where the first SCI message includes a first indication of the retransmission sidelink resources 310-a and 310-b. In this example, the retransmission sidelink resource 310-a may include a first retransmission occasion for retransmission of the first sidelink transmission, and the retransmission sidelink resource 310-b may include a second retransmission occasion for retransmission of the first sidelink transmission. In some aspects, the first SCI message may include an identifier (e.g., transmitter identifier (ID), receiver ID) that associates the first SCI message with the first UE 115-c, the second UE 115-d, or both.

At 515, the first UE 115-c may transmit the first sidelink transmission (e.g., sidelink data transmission, PSSCH transmission) associated with the first SCI message to the second UE 115-d. In some aspects, the first UE 115-c may transmit the first sidelink transmission based on transmitting the first SCI message. For example, the first SCI message may schedule the first sidelink transmission from the first UE 115-c to the second UE 115-d. In this regard, the first UE 115-c may transmit the first sidelink transmission (e.g., PSSCH transmission) to the second UE 115-b in accordance with the first SCI message. In some cases, the first UE 115-c may transmit the first sidelink transmission during the first TTI in which the first SCI message was transmitted or a subsequent TTI.

At 520, the second UE 115-d may transmit a feedback message (e.g., acknowledgement (ACK), negative acknowledgement (NACK)) to the first UE 115-c. In some aspects, the second UE 115-c may transmit the feedback message at 520 based on receiving (or not receiving) the first sidelink transmission at 515. For example, in cases where the second UE 115-*d* does not successfully receive the first sidelink transmission at 515, the second UE 115-*d* may transmit a NACK to the first UE 115-*c*. In this example, the feedback message (e.g., NACK) may indicate that the second UE 115-*d* did not successfully receive the first sidelink transmission. Conversely, by way of another example, in cases where the second UE 115-*d* does successfully receive the first sidelink transmission at 515, the second UE 115-*d* may transmit an ACK to the first UE 115-*c*. In this example, the feedback message (e.g., ACK) may indicate that the second UE 115-*d* did successfully receive the first sidelink transmission.

At 525, the first UE 115-*c*, the second UE 115-*c*, or both, may identify a set of resources (e.g., time resources, frequency resources) over which a second SCI message may or may not be transmitted or received. In this regard, the UE 115-*c* and/or 115-*d* may identify when a second SCI message which releases (e.g., cancels) resources reserved by the first SCI message may be transmitted or received. In this regard, the UEs 115 may identify a configured range of resources (e.g., configured range of time resources, configured range of frequency resources) in which the second SCI message may be transmitted and/or received. In some cases, the configured range of resources over which the second SCI message may be transmitted/received may be defined relative to resources used to transmit the first SCI message (e.g., first TTI (first slot) during which the first SCI message was transmitted, subchannel over which the first SCI message was transmitted). Additionally or alternatively, the configured range of resources over which the second SCI message may be transmitted/received may be defined relative to resources for the reserved retransmission occasions (e.g., TTIs (slots) of the retransmission occasions, subchannels of the retransmission occasions).

Accordingly, the first UE 115-*c*, the second UE 115-*d*, or both, may identify the set of resources over which a second SCI message may or may not be transmitted or received based on receiving the control message at 505, transmitting or receiving the first SCI message at 510, transmitting or receiving the first sidelink transmission at 515, transmitting or receiving the feedback message at 520, or any combination thereof.

For example, the first UE 115-*c*, the second UE 115-*d*, or both, may identify a time period preceding a first retransmission occasion associated with the first SCI message of the one or more retransmission occasions during which at least the first retransmission occasion is not to be released. For instance, as shown in FIG. 3, the first UE 115-*c* and/or the second UE 115-*d* may determine a time period $n_3$ preceding the retransmission sidelink resource 310-*a* (e.g., retransmission occasion) in which at least the retransmission sidelink resource 310-*a* is not to be released. By way of another example, the first UE 115-*c*, the second UE 115-*d*, or both, may identify a time period following the transmission of the first SCI message in which the one or more retransmission occasions are not to be released. For instance, as shown in FIG. 3, the first UE 115-*c* and/or the second UE 115-*d* may determine a time period $n_2$ following transmission of the first SCI message via initial sidelink resource 305 in which the one or more retransmission occasions scheduled by the first SCI message (e.g., retransmission sidelink resources 310-*a* and/or 310-*b*) are not to be released. In some cases, the determined time periods may be based on a HARQ configuration associated with sidelink communications. For instance, a HARQ configuration may specify that a feedback time interval for providing feedback to a sidelink transmission includes two slots. In this example, the time period following the first SCI message (e.g., time period $n_2$ illustrated in FIG. 3) may include at least two slots based on the feedback time interval associated with the HARQ configuration.

At 530, the first UE 115-*c*, the second UE 115-*d*, or both, may transmit the second SCI message associated with the first SCI message. In some aspects, the second SCI message may be transmitted during a second TTI (e.g., second slot) that is after the first TTI during which the first SCI message was transmitted. Additionally or alternatively, the second SCI message may be transmitted within the first set of resources reserved by the first SCI message (e.g., within a retransmission sidelink resource 310-*a* and/or 310-*b*). In some aspects, the second SCI message may include one or more TDRA field values indicative of a release of at least a subset of the first set of resources reserved by the first SCI message for retransmissions of the first sidelink transmission, where the release pertains to at least one retransmission occasion of the one or more retransmission occasions. For example, as shown in FIG. 3, the second SCI message transmitted via sidelink resource 315 may include one or more TDRA field values which provide a release of the retransmission sidelink resource 310-*a* (e.g., first retransmission occasion), the retransmission sidelink resource 310-*b* (e.g., second retransmission occasion), or both.

In some aspects, the one or more TDRA field values may include one or more TRIVs which are not associated with time resource reservations (e.g., TDRA values include TRIVs between 497 and 511). In some aspects, the second SCI message may be transmitted with a designated priority which is greater than a priority associated with other transmissions. In this regard, the second SCI message may have a higher priority in that receiving devices (e.g., first UE 115-*c*, second UE 115-*d*) are configured to receive and/or decode the second SCI message prior to other transmissions.

In some aspects, UEs 115 may be configured (e.g., via RRC signaling) to interpret TDRA field values (e.g., TRIVs) as releasing one or more retransmission occasions based on one or more indexes or look-up tables. For example, a UE 115 may be configured to reference one or more look-up tables to determine that a first unspecified TRIV value indicates a release of a first subset of retransmission occasions, and a second unspecified TRIV value indicates a release of a second subset of retransmission occasions.

The UEs 115 may transmit the second SCI message based on receiving the control message at 505, transmitting or receiving the first SCI message at 510, transmitting or receiving the first sidelink transmission at 515, transmitting or receiving the feedback message at 520, identifying the resources in which the second SCI message may be transmitted or received at 525, or any combination thereof. For example, in cases where the first UE 115-*c* receives the feedback message at 520 indicating that the first sidelink transmission was successfully received by the second UE 115-*d*, the first UE 115-*c* may transmit the second SCI message at 530 based on receiving the feedback message. By way of another example, in cases where the second UE 115-*d* successfully receives the first sidelink transmission at 515, the second UE 115-*d* may transmit the second SCI message to the first UE 115-*c*, where the second SCI message releases and/or cancels at least one retransmission occasion reserved for retransmissions of the first sidelink control information.

In some aspects, the first UE 115-*c* may prioritize resources that may be used for transmission of the second SCI message, whereas the second UE 115-d (and/or other UEs 115) may deprioritize the resources that may be used for the transmission of the second SCI message. For example, the UEs 115 may identify a set of candidate resources for transmission of the second SCI message based on transmitting the first SCI message. In this example, the UEs 115 may determine that the set of candidate resources have a higher priority for being selected for transmission of the second SCI message than for being selected for other sidelink transmission messages. Continuing with the same example, the UEs 115 may select, from the set of candidate resources, a set of resources for transmission of the second SCI message based on the set of candidate resources having the higher priority. By way of another example, the UEs 115 may identify a set of candidate resources for transmission of the second SCI message based on receiving the first SCI message. In this example, the UEs 115 may determine that the set of candidate resources have a lower priority for being selected for transmission of other sidelink transmission messages than for being selected for transmission of the second SCI message, and may refrain from selecting a set of resources from the set of candidate resources for transmission of the other sidelink transmission messages based on the set of candidate resources having the lower priority.

At 535, the first UE 115-c, the second UE 115-d, or both, may identify the second SCI message. In some aspects, the first UE 115-c and/or the second UE 115-d may be said to identify the second SCI message by transmitting the second SCI message, by receiving the second SCI message, or both. For example, from the perspective of the first UE 115-c, the first UE 115-c may identify the second SCI message at 535 by transmitting the second SCI message at 530, by receiving the second SCI message at 530, or both. In some aspects, as note previously herein, the second SCI message may be identified (e.g., transmitted, received) within the first set of resources reserved by the first SCI message (e.g., within a retransmission sidelink resource 310-a and/or 310-b).

In some aspects, the UEs 115 may identify the second SCI message at a time period inside or outside of time intervals during which the second SCI message may or may not be received, as determined at 525. For example, in cases where the UEs 115 identify a time period preceding a first retransmission occasion of the one or more retransmission occasions during which at least the first retransmission occasion is not to be released, the second SCI message may be identified (e.g., transmitted or released) before a start of the identified time period. By way of another example, in cases where the UEs 115 identify a time period following the transmission of the first SCI message during which at least the first retransmission occasion is not to be released, the second SCI message may be identified (e.g., transmitted or released) after an end of the identified time period.

By way of another example, the UEs 115 may identify the second SCI message based on identified resources (e.g., identified resource ranges) for transmission/reception of the second SCI message. For example, in some cases, the UEs 115 may identify a TTI range for transmission of the second SCI message, a subchannel range for transmission of the second SCI message, or both. The TTI range and/or the transmission subchannel range may be identified based on the control message received at 505, based on identifying (e.g., transmitting, receiving) the first SCI message at 510, or both. In this example, the UEs 115 may be configured to identify the second SCI message based on identifying the TTI range and/or the subchannel range.

At 540, the first UE 115-c, the second UE 115-d, or both, may identify the one or more TDRA field values within the second SCI message, the one or more TDRA field values indicating a release of at least a subset of the first set of resources reserved for retransmissions of the first sidelink transmission (e.g., retransmission sidelink resources 310-a and/or 310-b illustrated in FIG. 3). In some aspects, the UEs 115 may identify the TDRA field values based on receiving the control message at 505.

For example, the control message may include an indication of a set of TRIVs including a subset of TRIVs (e.g., TRIVs {0, . . . 511}) which includes a first subset of TRIVs associated with time resource reservations (e.g., TRIVs {0, . . . 496}), and a second subset of TRIVs which are not associated with time resource reservations (e.g., TRIVs {497, . . . 511}). In this example, the UEs 115 may identify the one or more TDRA field values by identifying one or more TRIVs within the second SCI message, where the one or more TRIVs include one or more TRIVs from the second subset of TRIVs (e.g., TRIVs {497, . . . 511}). In this regard, the UEs 115 may identify which resources reserved by the first SCI message (e.g., retransmission sidelink resources 310-a and/or 310-b) are to be released based on identifying one or more TDRA field values (e.g., TRIVs) which are not associated with time resource reservations.

At 545, the first UE 115-c, the second UE 115-d, or both, may identify one or more additional fields within the second SCI message. The one or more additional fields may include fields associated with DMRS, fields associated with DMRS ports, fields associated with a priority of sidelink communications, fields associated with a PSFCH overhead, FDRA fields, or any combination thereof. The one or more additional fields identified within the second SCI message may be used to convey various information. For example, as will be described in further detail herein, the one or more additional fields may be used to indicate which resources reserved by the first SCI message are to be released by the second SCI message. In this regard, the one or more additional fields may be used in addition to, or in the alternate to, the one or more TDRA fields in order to indicate which previously-reserved sidelink resources (e.g., retransmission sidelink resources 310-a and/or 310-b) are to be released.

Additionally or alternatively, the one or more additional fields (e.g., FDRA field values, DMRS fields, DMRS port fields, sidelink priority fields, PSFCH overhead fields) may be used to reserve a second set of resources for retransmissions of a second sidelink transmission. For example, referring to FIG. 3, the one or more additional fields within the second SCI message transmitted via sidelink resource 315 may be used to reserve retransmission sidelink resource 310-c for retransmissions of a second sidelink transmission (e.g., retransmission of second SCI message, retransmission of a PSSCH transmission, or both).

At 550, the first UE 115-c, the second UE 115-d, or both, may identify that the release of reserved resources provided by the second SCI message pertains to the at least one retransmission occasion reserved by the first SCI message. In this regard, as shown in FIG. 3, the first UE 115-c and/or the second UE 115-d may identify that the release provided by the second SCI message transmitted via sidelink resource 315 pertains to the retransmission sidelink resource 310-a (e.g., first retransmission occasion) and/or retransmission sidelink resource 310-b (e.g., second retransmission occasion). In some cases, the UE 115 which receives the second SCI message providing the release may be configured to identify that the release pertains to the at least one retransmission occasion by decoding the received second SCI message. In additional or alternative cases, the UE 115 which receives the second SCI message providing the release may be configured to identify that the release pertains to the at least one retransmission occasion without decoding the received second SCI message.

In some aspects, the UEs 115 may identify that the release pertains to the at least one retransmission occasion reserved by the first SCI message based on receiving the control message at 505, transmitting or receiving the first SCI message at 510, transmitting or receiving the first sidelink transmission at 515, transmitting or receiving the feedback message at 520, identifying the resources with which the second SCI message may be transmitted or received at 525, transmitting or receiving the second SCI message at 530, identifying the second SCI message at 535, identifying the TDRA field values at 540, identifying the additional fields at 545, or any combination thereof.

For example, in some cases, the one or more TDRA field values within the second SCI message may include an identifier of the first SCI message. In this example, the UEs 115 may be configured to identify that the release pertains to the at least one retransmission occasion scheduled by the first SCI message based on the identifier of the first SCI message within the second SCI message. In some aspects, the TDRA field values including an identifier of the SCI message associated with the release may enable the UEs 115 to identify which SCI message (e.g., first SCI message) from a set of SCI messages is associated with the release.

By way of another example, the first UE 115-c and/or the second UE 115-d may identify that the release pertains to the at least one retransmission occasion reserved by the first SCI message based on identifying SCI messages (e.g., the first SCI message) which are within a configured TTI of the second SCI message, a configured subchannel range of the second SCI message, or both. For example, the UEs 115 may be configured to identify a configured TTI and/or a configured subchannel range associated with the second SCI message. In some aspects, the configured TTI and/or the configured subchannel range may be configured via the control message received at 505. In this example, the UEs 115 may be configured to identify that the first SCI message and/or additional SCI messages within the configured TTI and/or configured subchannel range. In this regard, the UEs 115 may be configured to identify that the release pertains to the at least one retransmission occasion reserved by the first SCI message based on identifying the first SCI message (and/or additional SCI messages) within the configured TTI and/or configured subchannel range. For instance, referring to FIG. 3, the UEs 115 may identify a configured TTI of three slots, and may therefore identify that the release provided by the second SCI message is associated with the at least one retransmission occasion reserved by the first SCI message (e.g., retransmission sidelink resource 310-a and/or 310-b) based on identifying that the first SCI message transmitted via the initial sidelink resource 305 is within three slots of the second SCI message transmitted via the sidelink resource 315.

In some aspects, the first UE 115-c, the second UE 115-d, or both, may identify that the release pertains to the at least one retransmission occasion reserved by the first SCI message based on indications or fields within the first SCI message, the second SCI message, or both. For example, the UEs 115 may determine one or more TDRA field values of the first SCI message, FDRA field values of the first SCI message, a cyclic redundancy check (CRC) portion of the first SCI message, or any combination thereof, and may be configured to determine that the release pertains to the at least one retransmission occasion based on the determined indications or fields within the first SCI message. By way of another example, the UEs 115 may be configured to identify that the release pertains to the at least one retransmission occasion based on the one or more TDRA field values of the second SCI message determined at 540, the one or more additional field values (e.g., FDRA field values, DMRS fields, DMRS port fields, sidelink priority fields, PSFCH overhead fields) of the second SCI message determined at 545, or any combination thereof.

Additionally or alternatively, the UEs 115 may identify that the release pertains to the at least one retransmission occasion reserved by the first SCI message based on a portion of the second SCI message being associated with a checksum or hashing function of a portion of the first SCI message. For example, the UEs 115 may determine that the one or more TDRA field values of the second SCI message are associated with a checksum or a hashing function of at least a portion of data included within the first SCI message, and may identify that the release pertains to the at least one retransmission occasion based on identifying that the one or more TDRA field values within the second SCI message are associated with (e.g., include) the checksum or the hashing function of at least the portion of the data included within the first SCI message. In such cases the data included within the first SCI message may include a CRC portion of the first SCI message, a set of TDRA field values of the first SCI message, a set of FDRA field values of the first SCI message, a set of TDRA field values of the first SCI message, or any combination thereof. Similarly, the UEs 115 may be configured to identify that the release pertains to the at least one retransmission occasion reserved by the first SCI message based on identifying that the one or more TDRA field values of the second SCI message are associated with a checksum or hashing function of an identifier associated with the first UE 115-c (e.g., transmitter ID), the first TTI (e.g., first slot) during which the first SCI message was transmitted, or both.

In some cases, the UEs 115 may identify that the release pertains to the at least one retransmission occasion reserved by the first SCI message based on an explicit indication of the at least one retransmission occasion being released. For example, in some cases, the one or more TDRA field values may include an identifier of the at least one retransmission occasion associated with the release. For instance, referring to FIG. 3, the one or more TDRA field values within the second SCI message may include an indication of the retransmission sidelink resource 310-b. In this example, the UEs 115 may be configured to identify that the release is associated with the retransmission sidelink resource 310-b (but not the retransmission sidelink resource 310-a) based on the one or more TDRA field values.

By way of another example, in some cases, the second SCI message may include an identifier that associates the second SCI message with the first UE 115-c, the second UE 115-b, or both (e.g., transmitter ID, receiver ID). In this example, the one or more TDRA field values may include an indication of a release of all retransmission occasions associated with the first UE 115-c and/or second UE 115-d identified by the identifier. In this regard, the UEs 115 may identify that the release pertains to each of the one or more retransmission occasions associated with the identified UE 115 based on the one or more TDRA field values. In this regard, the one or more TDRA field values may indicate a special release of every reserved resource associated with a particular UE 115. Such a special release may be preconfigured (e.g., via RRC signaling) and identified via a look-up table.

For instance, referring to FIG. 3, the first UE 115-c may transmit the first SCI message via initial sidelink resource 305 which reserves retransmission sidelink resources 310-*a* and 310-*b* for retransmissions of a sidelink transmission from the first UE 115-*c* to the second UE 115-*d*. In this example, the second SCI message transmitted via sidelink resource 315 may include an indication of the first UE 115-*c*. In this example, the TDRA field values within the second SCI message may further include an indication of a release of all resources associated with the first UE 115-*c* identified by the second SCI message. In this regard, the UEs 115 may be configured to identify a release of both retransmission sidelink resource 310-*a* and 310-*b* are released based on the indication and the TDRA field values of the second SCI message.

By way of another example, in some cases, the first SCI message may include a first identifier associated with the first UE 115-*c* and/or the second UE 115-*d* (e.g., transmitter ID, receiver ID), and the second SCI message may include a second identifier that associates the second SCI message to the same UE 115 identified by the identifier within the first SCI message. For instance, the first SCI message may include a first identifier associated with the first UE 115-*c* (e.g., transmitter ID), and the second SCI message may include a second identifier associated with the first UE 115-*c* (e.g., corresponding or matching transmitter ID). In such cases, the UEs 115 may be configured to identify that the release pertains to the at least one retransmission occasion scheduled by the first SCI message based on the first identifier (e.g., transmitter ID, receiver ID) of the first SCI message and the second identifier (e.g., transmitter ID, receiver ID) of the second SCI message.

In some aspects, the UEs 115 may be configured to determine whether the second SCI message reserves future reservations for retransmissions of a second sidelink transmission associated with the second SCI message based on the one or more TDRA field values. For example, referring to FIG. 3, the UEs 115 may be configured to determine that the one or more TDRA field values within the second SCI message transmitted via sidelink resource 315 are indicative of a release of the retransmission sidelink resource 310-*a* and/or 310-*b*. In this example, the UEs 115 may be further configured to identify that the one or more TDRA field values are not indicative of future reservations (e.g., not indicative of a reservation of retransmission sidelink resource 310-*c*) for retransmissions of a second sidelink transmission associated with the second SCI message based on the TDRA field values being associated with the release.

Additionally or alternatively, the UEs 115 may be configured to identify that one or more additional TDRA field values and/or the one or more additional field values (e.g., FDRA field values) within the second SCI message are indicative of a future reservation for retransmissions of a second sidelink transmission associated with the second SCI message. For example, the UEs 115 may identify one or more additional TDRA field values within the second SCI message (e.g., one or more TDRA field values which are not indicative of a release of retransmission sidelink resources 310-*a* and/or 310-*b*). In this example, the one or more additional TDRA field values may include an indication of future reservations (e.g., indicative of a reservation of retransmission sidelink resource 310-*c*) for retransmissions of a second sidelink transmission associated with the second SCI message. Moreover, the UEs 115 may be configured to interpret (e.g., re-interpret) additional fields (e.g., FDRA field values) within the second SCI message as being indicative of future reservations. For example, the UEs 115 may be configured to interpret the one or more FDRA field values within the second SCI message identified at 545 based on identifying that the one or more TDRA field values are indicative of the release of the at least one retransmission occasion. In this example, the UEs 115 may be configured to interpret the one or more FDRA field values as pertaining to (e.g., indicating) the release of the at least one retransmission occasion, as pertaining to (e.g., indicating) the reservation of future resources (e.g., retransmission sidelink resource 310-*c*), or both.

In some aspects, the UEs 115 may be configured to calculate and/or recalculate a channel occupancy ratio of a sidelink communication network (e.g., sidelink channel) based on identifying the release. For example, the UEs 115 may be configured to determine a first channel occupancy ratio of a sidelink communication network prior to transmitting/receiving the second SCI (e.g., prior to identifying the second SCI message), and may determine a second channel occupancy ratio of the sidelink communication network based on identifying the second SCI message providing the release (e.g., based on identifying the release).

At 555, the first UE 115-*c* may transmit retransmissions of the first sidelink transmission transmitted at 515 using only a second subset of the first set of resources reserved for retransmissions in accordance with the release of the first subset of resources. Furthermore, the second UE 115-*d* may monitor retransmission occasions of the one or more retransmission occasions in accordance with the identified release. For example, referring to FIG. 3, the first SCI message may include a set of resources (e.g., retransmission sidelink resources 310-*a* and 310-*b*) reserved for retransmissions of a first sidelink transmission. In this example, the second SCI message transmitted via sidelink resource 315 may indicate a release of the retransmission sidelink resource 310-*a* (e.g., release first subset of the reserved resources). In this regard, the first UE 115-*c* may transmit a retransmission of the first sidelink transmission using the retransmission sidelink resource 310-*b* (e.g., using second subset of the reserved resources).

In some aspects, the second SCI message may release or cancel the entirety of the first set of resources reserved by the first SCI message. For example, the second SCI message may release both the retransmission sidelink resources 310-*a* and 310-*b*. In such cases, the second subset of the first set of resources may include no resources such that the first UE 115-*c* refrains from performing any retransmissions of the first sidelink transmission. Similarly, in such cases, the second UE 115-*d* may refrain from monitoring any retransmission occasions of the one or more retransmission occasions reserved by the first SCI message and released by the second SCI message.

At 560, the second UE 115-*d*, a third UE 115 (not shown), or both, may transmit a sidelink transmission using at least a portion of the first subset of resources released via the second SCI message. In this regard, the UEs 115 may transmit and/or receive a sidelink transmission at 560 using the resources released by the second SCI message based on identifying the release pertains to the at least one retransmission occasion at 550. For example, in cases where the second SCI message releases the retransmission sidelink resource 310-*a*, the second UE 115-*d* may transmit a sidelink transmission to the first UE 115-*c* and/or another UE 115 using the retransmission sidelink resource 310-*b*.

In some cases, the re-use of the released sidelink resources may be prohibited based on pre-defined parameters including the time at which the second SCI was transmitted/received, the time resources for the released resources, communications parameters at the UEs 115, or any combination thereof. For example, an immediate reuse of the resources released via the second SCI message may be prohibited if a UE 115 switched from transmission to reception in a given quantity of slots in order to conduct half-duplex communications.

Figure 6:
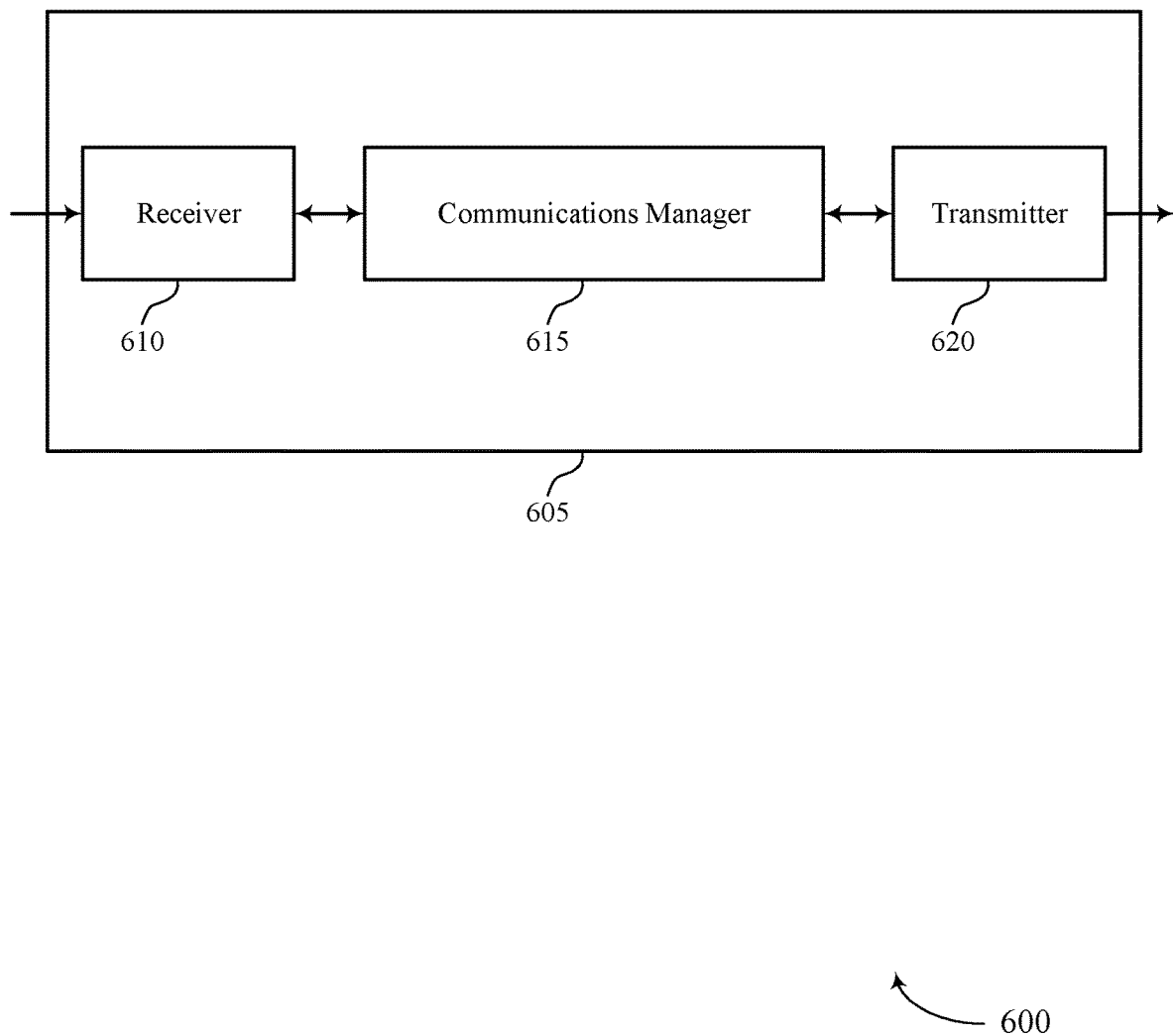
FIGS. 6 and 7 show block diagrams of devices that support techniques for sidelink resource cancellation using TRIVs in accordance with aspects of the present disclosure.

FIG. 6 shows a block diagram 600 of a device 605 that supports techniques for sidelink resource cancellation using TRIVs in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for sidelink resource cancellation using TRIVs, etc.). Information may be passed on to other components of the device 605. The receiver 610 may be an example of aspects of the transceiver 920 described with reference to FIG. 9. The receiver 610 may utilize a single antenna or a set of antennas.

In the context of a UE 115 which transmits a first SCI message which reserves sidelink resources, the communications manager 615 may transmit, during a first TTI, a first SCI message associated with a sidelink transmission from the first UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions, and transmit the retransmissions of the sidelink transmission on only a second subset of the set of resources in accordance with the release of the first subset of the set of resources.

In the context of a UE 115 which receives a first SCI message which reserves sidelink resources, the communications manager 615 may receive, from a first UE during a first TTI, a first SCI message associated with a sidelink transmission from the first UE to the second UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions, and monitor only a second subset of the set of resources in accordance with the release of the first subset of the set of resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
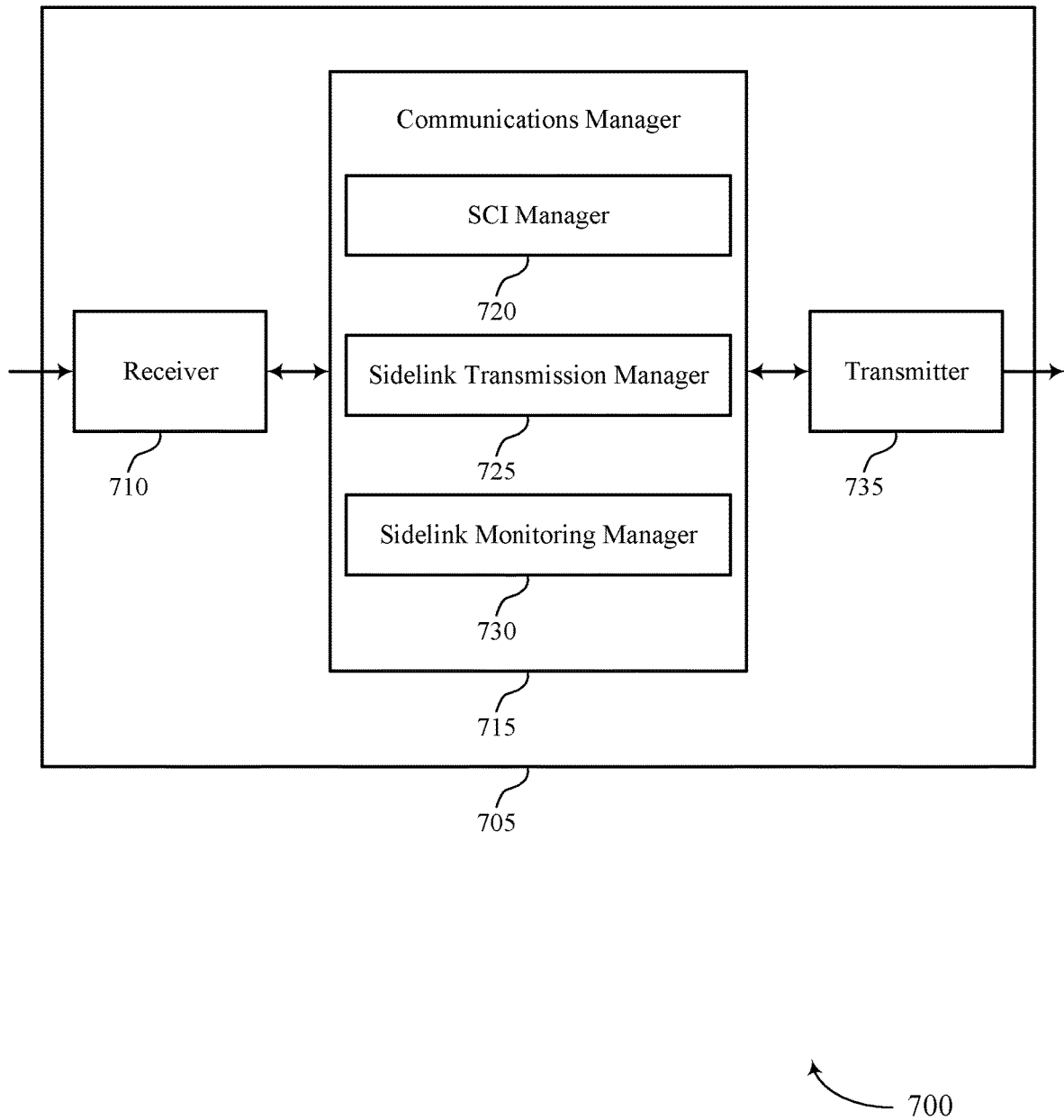

FIG. 7 shows a block diagram 700 of a device 705 that supports techniques for sidelink resource cancellation using TRIVs in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for sidelink resource cancellation using TRIVs, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a SCI manager 720, a sidelink transmission manager 725, and a sidelink monitoring manager 730. The communications manager 715 may be an example of aspects of the communications manager 910 described herein.

The SCI manager 720 may transmit, during a first TTI, a first SCI message associated with a sidelink transmission from the first UE, where the first SCI message includes a first indication of a set of resources reserved for retransmissions of the sidelink transmission at one or more retransmission occasions and identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions.

The sidelink transmission manager 725 may transmit the retransmissions of the sidelink transmission on only a second subset of the set of resources in accordance with the release of the first subset of the set of resources.

The SCI manager 720 may receive, from a first UE during a first TTI, a first SCI message associated with a sidelink transmission from the first UE to the second UE, where the first SCI message includes a first indication of a set of resources reserved for retransmissions of the sidelink transmission at one or more retransmission occasions and identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions.

The sidelink monitoring manager 730 may monitor only a second subset of the set of resources in accordance with the release of the first subset of the set of resources.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
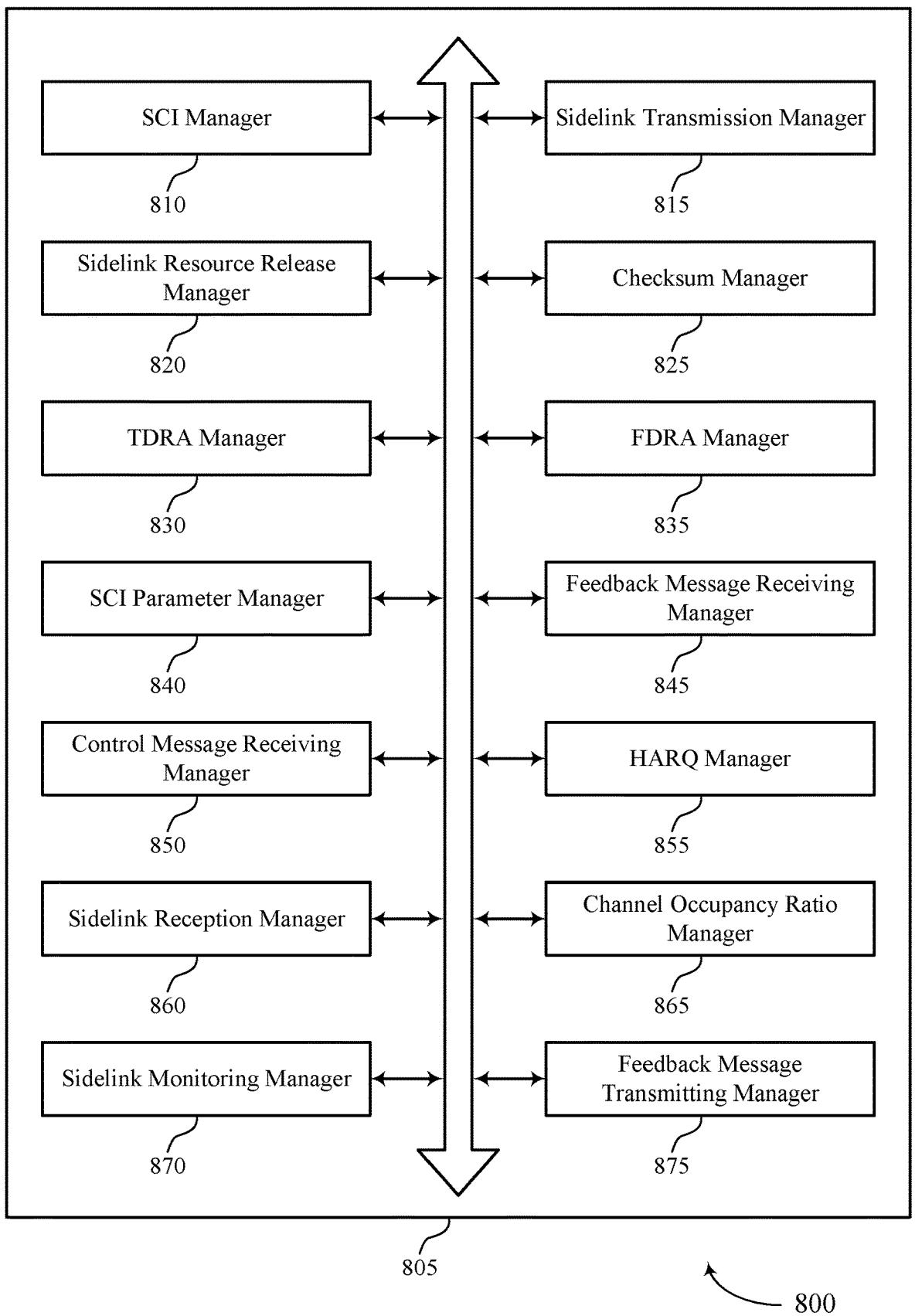
FIG. 8 shows a block diagram of a communications manager that supports techniques for sidelink resource cancellation using TRIVs in accordance with aspects of the present disclosure.

FIG. 8 shows a block diagram 800 of a communications manager 805 that supports techniques for sidelink resource cancellation using TRIVs in accordance with aspects of the present disclosure. The communications manager 805 may be an example of aspects of a communications manager 615, a communications manager 715, or a communications manager 910 described herein. The communications manager 805 may include a SCI manager 810, a sidelink transmission manager 815, a sidelink resource release manager 820, a checksum manager 825, a TDRA manager 830, a FDRA manager 835, a SCI parameter manager 840, a feedback message receiving manager 845, a control message receiving manager 850, a HARQ manager 855, a sidelink reception manager 860, a channel occupancy ratio manager 865, a sidelink monitoring manager 870, and a feedback message transmitting manager 875. Each of these modules may communicate, directly or indirectly, with one another (e.g., via one or more buses).

The SCI manager 810 may transmit, during a first TTI, a first SCI message associated with a sidelink transmission from the first UE, where the first SCI message includes a first indication of a set of resources reserved for retransmissions of the sidelink transmission at one or more retransmission occasions. In some examples, the SCI manager 810 may identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions. In some examples, the SCI manager 810 may identify one or more SCI message transmissions that are within a configured TTI range and subchannel range of the second SCI message. In some examples, the SCI manager 810 may identify, based on the one or more TDRA field values, the first SCI message from the one or more SCI message transmissions. In some examples, identifying the second SCI message includes receiving the second SCI message from a second UE. In some examples, the SCI manager 810 may transmit, via the first SCI message, a first identifier that associates the first SCI message with the first UE, a second UE to which the sidelink transmission was directed, or both, where the second SCI message includes a second identifier that associates the second SCI message with a same UE identified by the first identifier.

In some examples, the SCI manager 810 may identify a time period preceding a first retransmission occasion of the one or more retransmission occasions during which at least the first retransmission occasion is not to be released, where the second SCI message is identified before a start of the identified time period. In some examples, the SCI manager 810 may identify a time period following the transmission of the first SCI message in which the one or more retransmission occasions are not to be released, where the second SCI message is identified after an end of the identified time period. In some examples, the SCI manager 810 may identify, based on transmission of the first SCI message, a TTI range for transmission of the second SCI message, a subchannel range for transmission of the second SCI message, or both, where identifying the second SCI message is based on identifying the TTI range, the subchannel range, or both. In some examples, the SCI manager 810 may identify one or more SCI message transmissions that are within a configured TTI range and subchannel range of the second SCI message.

In some examples, the SCI manager 810 may identify a set of candidate resources for transmission of the second SCI message based on receiving the first SCI message, where the set of candidate resources have a higher priority for being selected for transmission of the second SCI message than for being selected for other sidelink transmissions. In some examples, the SCI manager 810 may select, from the set of candidate resources, a set of resources for transmission of the second SCI message based on the set of candidate resources having the higher priority. In some examples, the SCI manager 810 may identify, based on the one or more TDRA field values, the first SCI message from the one or more SCI message transmissions. In some examples, the SCI manager 810 may identify that the release pertains to the at least one retransmission occasion based on the identifier of the at least one retransmission occasion. In some examples, identifying the second SCI message includes transmitting the second SCI message to the first UE. In some examples, the SCI manager 810 may receive, via the first SCI message, a first identifier that associates the first SCI message with the first UE, the second UE, or both, where the second SCI message includes a second identifier that associates the second SCI message with a same UE identified by the first identifier.

In some examples, the SCI manager 810 may identify a time period preceding a first retransmission occasion of the one or more retransmission occasions during which at least the first retransmission occasion is not to be released, where the second SCI message is identified before a start of the identified time period. In some examples, the SCI manager 810 may identify a time period following the transmission of the first SCI message in which the one or more retransmission occasions are not to be released, where the second SCI message is identified after an end of the identified time period. In some examples, the SCI manager 810 may identify, based on reception of the first SCI message, a TTI range for transmission of the second SCI message, a subchannel range for transmission of the second SCI message, or both, where identifying the second SCI message is based on identifying the TTI range, the subchannel range, or both.

In some examples, the SCI manager 810 may identify a set of candidate resources for transmission of the second SCI message based on receiving the first SCI message, where the set of candidate resources have a higher priority for being selected for transmission of the second SCI message than for being selected for other sidelink transmission messages. In some examples, the SCI manager 810 may select a set of resources for transmission of a second sidelink transmission based on the set of candidate resources having the higher priority. In some examples, the SCI manager 810 may identify a set of candidate resources for transmission of the second SCI message based on receiving the first SCI message, where the set of candidate resources have a lower priority for being selected for transmission of other sidelink transmission messages than for being selected for transmission of the second SCI message. In some cases, the second SCI message is identified within the set of resources reserved for retransmissions of the sidelink transmission. In some cases, the second SCI message is transmitted with a designated priority which is greater than a priority associated with other transmissions.

The sidelink transmission manager 815 may transmit the retransmissions of the sidelink transmission on only a second subset of the set of resources in accordance with the release of the first subset of the set of resources. In some examples, the sidelink transmission manager 815 may transmit the sidelink transmission in accordance with the first SCI message. In some examples, transmitting retransmissions of the sidelink transmission on only the second subset of the set of resources includes refraining from performing any retransmissions of the sidelink transmission. In some examples, the sidelink transmission manager 815 may transmit, to the first UE, a third UE, or both, a second sidelink transmission over a set of resources associated with the at least one retransmission occasion released via the second SCI message, where the second sidelink transmission is transmitted based on identifying the second SCI message. In some examples, the sidelink transmission manager 815 may refrain from selecting a set of resources from the set of candidate resources for transmission of the other sidelink transmission messages based on the set of candidate resources having the lower priority.

The sidelink monitoring manager 870 may monitor only a second subset of the set of resources in accordance with the release of the first subset of the set of resources. In some examples, monitoring only the second subset of the set of resources includes refraining from monitoring any retransmission occasions of the one or more retransmission occasions.

The sidelink resource release manager 820 may identify that the release pertains to the at least one retransmission occasion based on the identifier of the first SCI message. In some examples, the sidelink resource release manager 820 may identify that the release pertains to the at least one retransmission occasion based on the identification of the first SCI message. In some examples, the sidelink resource release manager 820 may identify that the release pertains to the at least one retransmission occasion based on identifying that the one or more TDRA field values within the second SCI message are associated with the checksum or the hashing function of at least the portion of data included within the first SCI message. In some examples, the sidelink resource release manager 820 may identify that the release pertains to the at least one retransmission occasion based on identifying that the one or more TDRA field values within the second SCI message are associated with the checksum or the hashing function of the identifier associated with the first UE, the first TTI, or both.

In some examples, the sidelink resource release manager 820 may identify that the release pertains to each of the one or more retransmission occasions based on the one or more TDRA field values. In some examples, the sidelink resource release manager 820 may identify that the release pertains to the at least one retransmission occasion based on the identifier of the at least one retransmission occasion. In some examples, the sidelink resource release manager 820 may identify that the release pertains to the at least one retransmission occasion of the one or more retransmission occasions based on the one or more TDRA field values, the one or more additional fields within the second SCI message, or both.

The checksum manager 825 may identify that the one or more TDRA field values are associated with a checksum or a hashing function of at least a portion of data included within the first SCI message. In some examples, the checksum manager 825 may identify that the one or more TDRA field values are associated with a checksum or a hashing function of an identifier associated with the first UE, the first TTI, or both. In some cases, the data included within the first SCI message includes a first CRC portion of the first SCI message, a set of TDRA values of the first SCI message, a set of FDRA values of the first SCI message, or any combination thereof.

The TDRA manager 830 may identify that the one or more TDRA field values include an indication of a release of all retransmission occasions associated with the first UE or the second UE identified by the identifier. In some examples, the TDRA manager 830 may determine, based on the one or more TDRA field values being indicative of the release of at least the first subset of the set of resources reserved for the retransmissions of the sidelink transmission, that the one or more TDRA field values are not indicative of future reservations for retransmissions of a second sidelink transmission associated with the second SCI message. In some examples, the TDRA manager 830 may identify one or more additional TDRA field values in the second SCI message, where the one or more additional TDRA field values are indicative of future reservations for retransmissions of a second sidelink transmission associated with the second SCI message.

In some examples, the TDRA manager 830 may identify that the one or more TDRA field values include an indication of a release of all retransmission occasions associated with the first UE or the second UE identified by the identifier. In some examples, the TDRA manager 830 may identify that the release pertains to each of the one or more retransmission occasions based on the one or more TDRA field values. In some examples, the TDRA manager 830 may determine, based on the one or more TDRA field values being indicative of the release of at least the first subset of the set of resources reserved for the retransmissions of the sidelink transmission, that the one or more TDRA field values are not indicative of future reservations for retransmissions of a second sidelink transmission associated with the second SCI message. In some examples, the TDRA manager 830 may identify one or more additional TDRA field values in the second SCI message, where the one or more additional TDRA field values are indicative of future reservations for retransmissions of a second sidelink transmission associated with the second SCI message. In some cases, the one or more TDRA field values include one or more TRIVs which are not associated with time resource reservations.

The FDRA manager 835 may interpret one or more FDRA field values in the second SCI message based on the one or more TDRA field value being indicative of the release of at least the first subset of the set of resources reserved for the retransmissions of the sidelink transmission, where the interpretation of the one or more FDRA field values pertains to the release of at least the first subset of the set of resources reserved for the retransmissions of the sidelink transmission.

The SCI parameter manager 840 may identify one or more additional fields within the second SCI message. In some examples, the SCI parameter manager 840 may identify that the release pertains to the at least one retransmission occasion of the one or more retransmission occasions based on the one or more TDRA field values, the one or more additional fields within the second SCI message, or both. In some cases, the one or more additional fields within the second SCI message include a first field associated with DMRS, a second field associated with ports used for DMRS, a third field associated with priority of sidelink communications, a fourth field associated with a PSFCH overhead, a fifth field associated with a FDRA, or any combination thereof.

The feedback message receiving manager 845 may receive, from a second UE, a feedback message indicating that the second UE received the sidelink transmission, where the UE identifies the second SCI message by generating the second SCI message based on the feedback message.

The control message receiving manager 850 may receive a control message including an indication of a set of TRIVs including a first subset of TRIVs associated with time resource reservations, and a second subset of TRIVs which are not associated with time resource reservations, where the one or more TDRA field values in the second SCI message include a TRIV from the second subset of TRIVs. In some examples, the control message receiving manager 850 may receive a control message indicating a relationship between the first SCI message and the TTI range, the subchannel range, or both.

The HARQ manager 855 may identify a HARQ configuration associated with sidelink communications, where identifying the time period following the transmission of the first SCI message is based on the determined HARQ configuration.

The sidelink reception manager 860 may receive, from a second UE to which the sidelink transmission was directed, a third UE, or both, a second sidelink transmission over a set of resources associated with the at least one retransmission occasion released via the second SCI message, where the second sidelink transmission is received based on identifying the second SCI message. In some examples, the sidelink reception manager 860 may receive the sidelink transmission from the first UE in accordance with the first SCI message.

The channel occupancy ratio manager 865 may determine a first channel occupancy ratio of a sidelink communication network prior to transmitting the second SCI. In some examples, the channel occupancy ratio manager 865 may determine a second channel occupancy ratio of the sidelink communication network based on identifying the second SCI providing the release.

The feedback message transmitting manager 875 may transmit, to the first UE, a feedback message indicating receipt of the sidelink transmission, where the UE identifies the second SCI message by receiving the second SCI message based on the feedback message.

Figure 9:
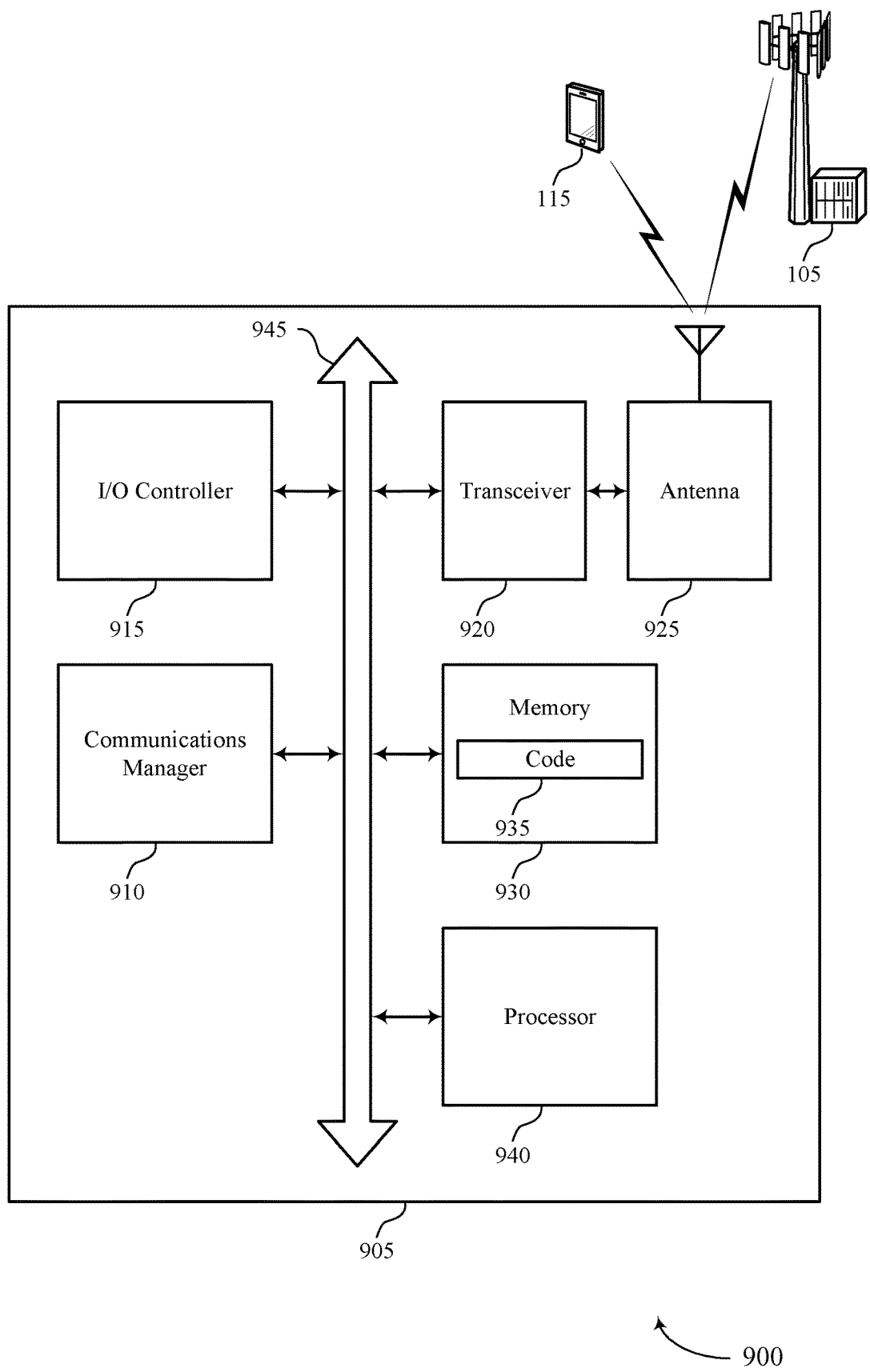
FIG. 9 shows a diagram of a system including a device that supports techniques for sidelink resource cancellation using TRIVs in accordance with aspects of the present disclosure.

FIG. 9 shows a diagram of a system 900 including a device 905 that supports techniques for sidelink resource cancellation using TRIVs in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

In the context of a UE 115 which transmits a first SCI message which reserves sidelink resources, the communications manager 910 may transmit, during a first TTI, a first SCI message associated with a sidelink transmission from the first UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions, and transmit the retransmissions of the sidelink transmission on only a second subset of the set of resources in accordance with the release of the first subset of the set of resources.

In the context of a UE 115 which transmits a first SCI message which reserves sidelink resources, the communications manager 910 may receive, from a first UE during a first TTI, a first SCI message associated with a sidelink transmission from the first UE to the second UE, where the first SCI message includes a first indication of a set of resources reserved for retransmissions of the sidelink transmission at one or more retransmission occasions, identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions, and monitor only a second subset of the set of resources in accordance with the release of the first subset of the set of resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for sidelink resource cancellation using TRIVs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
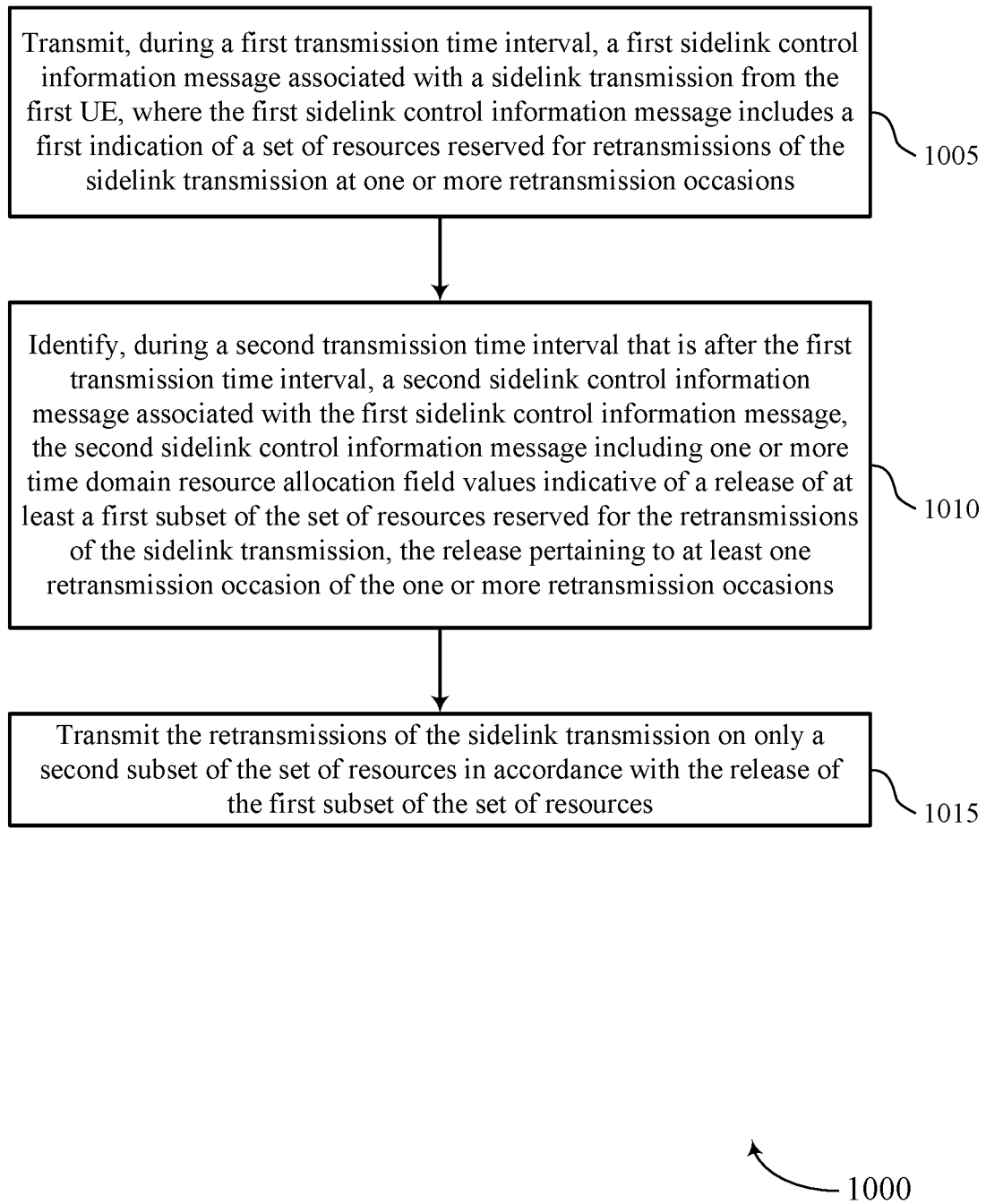
FIGS. 10 through 13 show flowcharts illustrating methods that support techniques for sidelink resource cancellation using TRIVs in accordance with aspects of the present disclosure.

FIG. 10 shows a flowchart illustrating a method 1000 that supports techniques for sidelink resource cancellation using TRIVs in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may transmit, during a first TTI, a first SCI message associated with a sidelink transmission from the first UE, where the first SCI message includes a first indication of a set of resources reserved for retransmissions of the sidelink transmission at one or more retransmission occasions. The operations of 1005 may be performed according to the methods described herein. In some examples, aspects of the operations of 1005 may be performed by a SCI manager as described with reference to FIGS. 6 through 9.

At 1010, the UE may identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions. The operations of 1010 may be performed according to the methods described herein. In some examples, aspects of the operations of 1010 may be performed by a SCI manager as described with reference to FIGS. 6 through 9.

At 1015, the UE may transmit the retransmissions of the sidelink transmission on only a second subset of the set of resources in accordance with the release of the first subset of the set of resources. The operations of 1015 may be performed according to the methods described herein. In some examples, aspects of the operations of 1015 may be performed by a sidelink transmission manager as described with reference to FIGS. 6 through 9.

Figure 11:
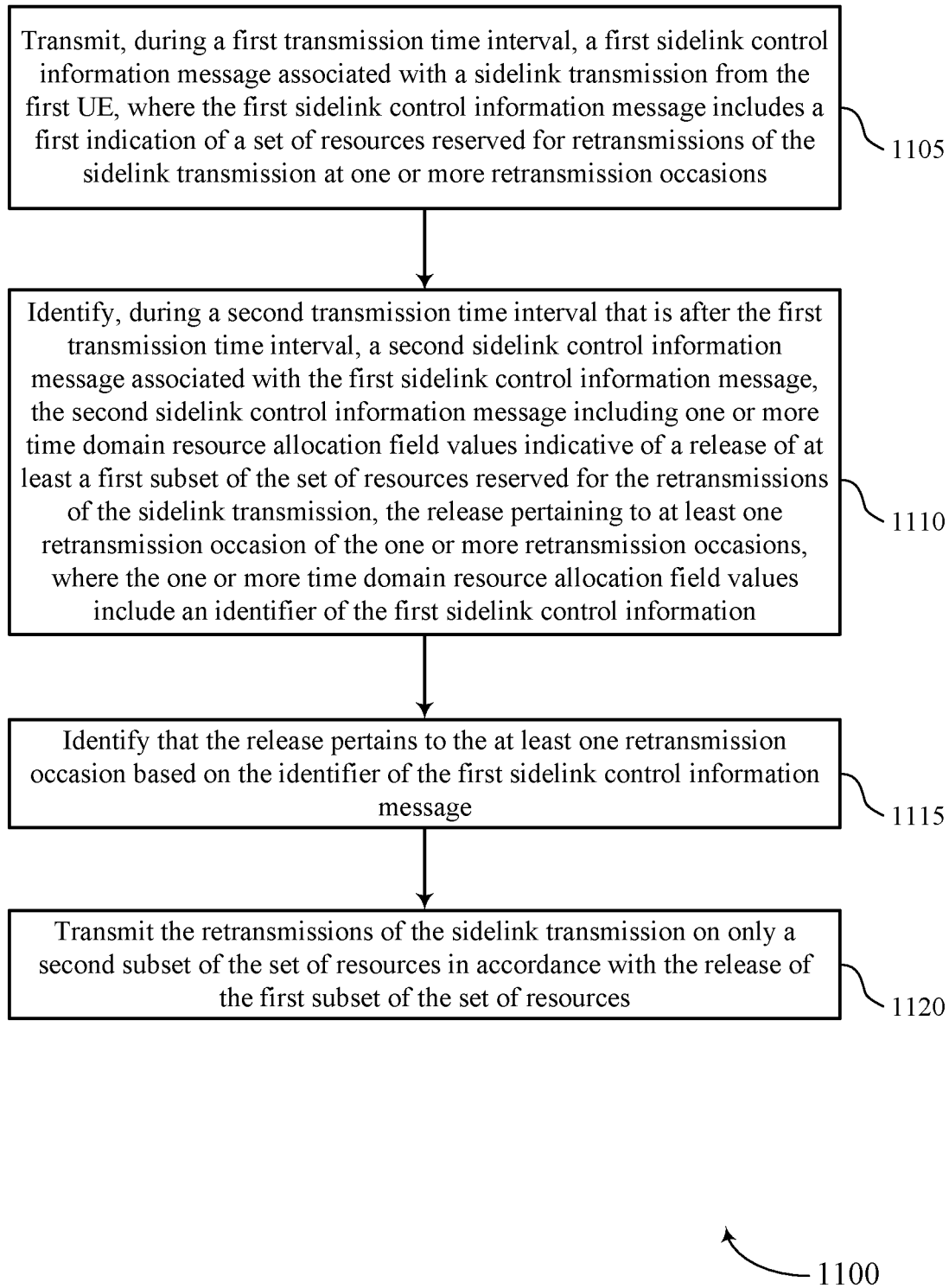

FIG. 11 shows a flowchart illustrating a method 1100 that supports techniques for sidelink resource cancellation using TRIVs in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may transmit, during a first TTI, a first SCI message associated with a sidelink transmission from the first UE, where the first SCI message includes a first indication of a set of resources reserved for retransmissions of the sidelink transmission at one or more retransmission occasions. The operations of 1105 may be performed according to the methods described herein. In some examples, aspects of the operations of 1105 may be performed by a SCI manager as described with reference to FIGS. 6 through 9.

At 1110, the UE may identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions, where the one or more TDRA field values include an identifier of the first SCI. The operations of 1110 may be performed according to the methods described herein. In some examples, aspects of the operations of 1110 may be performed by a SCI manager as described with reference to FIGS. 6 through 9.

At 1115, the UE may identify that the release pertains to the at least one retransmission occasion based on the identifier of the first SCI message. The operations of 1115 may be performed according to the methods described herein. In some examples, aspects of the operations of 1115 may be performed by a sidelink resource release manager as described with reference to FIGS. 6 through 9.

At 1120, the UE may transmit the retransmissions of the sidelink transmission on only a second subset of the set of resources in accordance with the release of the first subset of the set of resources. The operations of 1120 may be performed according to the methods described herein. In some examples, aspects of the operations of 1120 may be performed by a sidelink transmission manager as described with reference to FIGS. 6 through 9.

Figure 12:
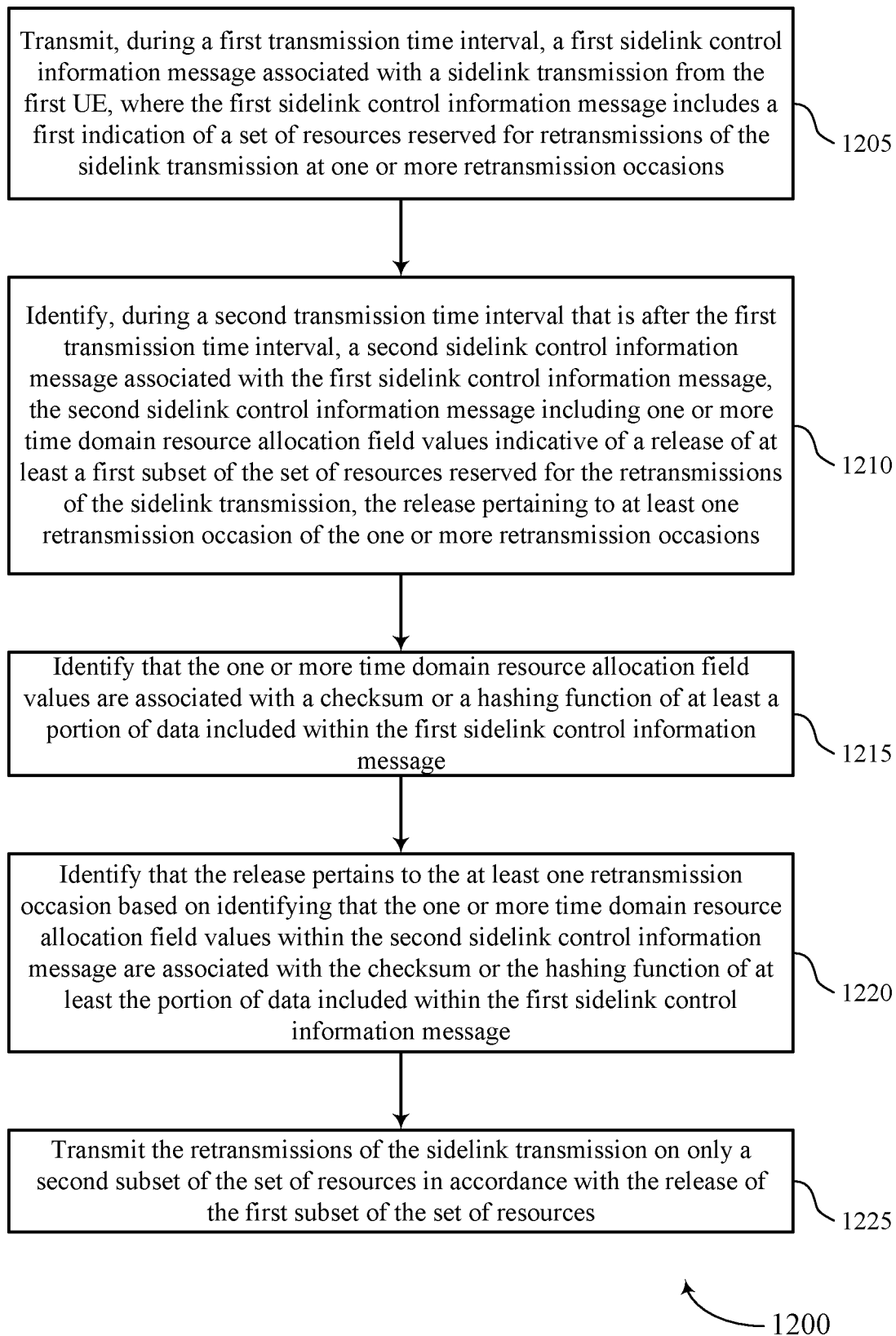

FIG. 12 shows a flowchart illustrating a method 1200 that supports techniques for sidelink resource cancellation using TRIVs in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may transmit, during a first TTI, a first SCI message associated with a sidelink transmission from the first UE, where the first SCI message includes a first indication of a set of resources reserved for retransmissions of the sidelink transmission at one or more retransmission occasions. The operations of 1205 may be performed according to the methods described herein. In some examples, aspects of the operations of 1205 may be performed by a SCI manager as described with reference to FIGS. 6 through 9.

At 1210, the UE may identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions. The operations of 1210 may be performed according to the methods described herein. In some examples, aspects of the operations of 1210 may be performed by a SCI manager as described with reference to FIGS. 6 through 9.

At 1215, the UE may identify that the one or more TDRA field values are associated with a checksum or a hashing function of at least a portion of data included within the first SCI message. The operations of 1215 may be performed according to the methods described herein. In some examples, aspects of the operations of 1215 may be performed by a checksum manager as described with reference to FIGS. 6 through 9.

At 1220, the UE may identify that the release pertains to the at least one retransmission occasion based on identifying that the one or more TDRA field values within the second SCI message are associated with the checksum or the hashing function of at least the portion of data included within the first SCI message. The operations of 1220 may be performed according to the methods described herein. In some examples, aspects of the operations of 1220 may be performed by a sidelink resource release manager as described with reference to FIGS. 6 through 9.

At 1225, the UE may transmit the retransmissions of the sidelink transmission on only a second subset of the set of resources in accordance with the release of the first subset of the set of resources. The operations of 1225 may be performed according to the methods described herein. In some examples, aspects of the operations of 1225 may be performed by a sidelink transmission manager as described with reference to FIGS. 6 through 9.

Figure 13:
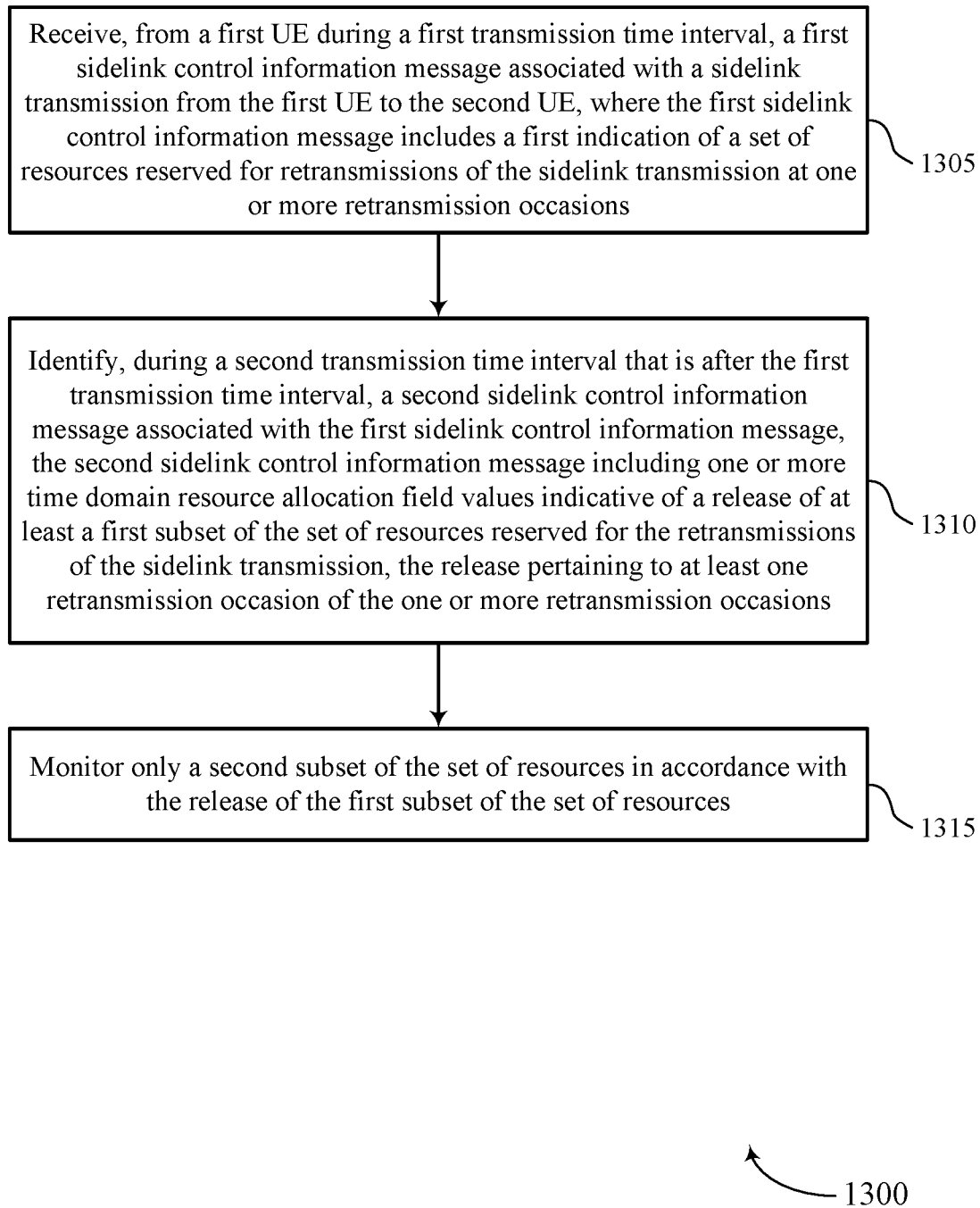

FIG. 13 shows a flowchart illustrating a method 1300 that supports techniques for sidelink resource cancellation using TRIVs in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive, from a first UE during a first TTI, a first SCI message associated with a sidelink transmission from the first UE to the second UE, where the first SCI message includes a first indication of a set of resources reserved for retransmissions of the sidelink transmission at one or more retransmission occasions. The operations of 1305 may be performed according to the methods described herein. In some examples, aspects of the operations of 1305 may be performed by a SCI manager as described with reference to FIGS. 6 through 9.

At 1310, the UE may identify, during a second TTI that is after the first TTI, a second SCI message associated with the first SCI message, the second SCI message including one or more TDRA field values indicative of a release of at least a first subset of the set of resources reserved for the retransmissions of the sidelink transmission, the release pertaining to at least one retransmission occasion of the one or more retransmission occasions. The operations of 1310 may be performed according to the methods described herein. In some examples, aspects of the operations of 1310 may be performed by a SCI manager as described with reference to FIGS. 6 through 9.

At 1315, the UE may monitor only a second subset of the set of resources in accordance with the release of the first subset of the set of resources. The operations of 1315 may be performed according to the methods described herein. In some examples, aspects of the operations of 1315 may be performed by a sidelink monitoring manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: transmitting, during a first TTI, a first SCI message associated with a sidelink transmission from the first UE, wherein the first SCI message comprises a first indication of a set of resources reserved for retransmissions of the sidelink transmission at one or more retransmission occasions; identifying, during a second TTI that is after the first TTI, a second SCI message associated with the first SCI message, the second SCI message including one or more TDRA field values indicative of at least a first subset of the set of resources and a release of the at least first subset of the set of resources reserved for the retransmissions of the sidelink transmission, the release pertaining to at least one retransmission occasion of the one or more retransmission occasions; and transmitting the retransmissions of the sidelink transmission on only a second subset of the set of resources in accordance with the release of the first subset of the set of resources.

Aspect 2: The method of aspect 1, wherein the one or more TDRA field values comprise an identifier of the first SCI message, the method further comprising: identifying that the release pertains to the at least one retransmission occasion based at least in part on the identifier of the first SCI message.

Aspect 3: The method of any of aspects 1 through 2, further comprising: identifying one or more SCI message transmissions that are within a configured TTI range and subchannel range of the second SCI message; identifying, based at least in part on the one or more TDRA field values, the first SCI message from the one or more SCI message transmissions; and identifying that the release pertains to the at least one retransmission occasion based at least in part on the identification of the first SCI message.

Aspect 4: The method of any of aspects 1 through 3, further comprising: identifying that the one or more TDRA field values are associated with a checksum or a hashing function of at least a portion of data included within the first SCI message; and identifying that the release pertains to the at least one retransmission occasion based at least in part on identifying that the one or more TDRA field values within the second SCI message are associated with the checksum or the hashing function of at least the portion of data included within the first SCI message.

Aspect 5: The method of aspect 4, wherein the data included within the first SCI message comprises a first cyclic redundancy check portion of the first SCI message, a set of TDRA values of the first SCI message, a set of FDRA values of the first SCI message, or any combination thereof.

Aspect 6: The method of any of aspects 1 through 5, further comprising: identifying that the one or more TDRA field values are associated with a checksum or a hashing function of an identifier associated with the first UE, the first TTI, or both; and identifying that the release pertains to the at least one retransmission occasion based at least in part on identifying that the one or more TDRA field values within the second SCI message are associated with the checksum or the hashing function of the identifier associated with the first UE, the first TTI, or both.

Aspect 7: The method of any of aspects 1 through 6, wherein the second SCI message comprises an identifier that associates the second SCI message with the first UE, the method further comprising: identifying that the one or more TDRA field values comprise an indication of a release of all retransmission occasions associated with the first UE or the second UE identified by the identifier; and identifying that the release pertains to each of the one or more retransmission occasions based at least in part on the one or more TDRA field values.

Aspect 8: The method of any of aspects 1 through 7, wherein the one or more TDRA field values comprise an identifier of the at least one retransmission occasion associated with the release, the method further comprising: identifying that the release pertains to the at least one retransmission occasion based at least in part on the identifier of the at least one retransmission occasion.

Aspect 9: The method of any of aspects 1 through 8, further comprising: determining, based at least in part on the one or more TDRA field values being indicative of the release of at least the first subset of the set of resources reserved for the retransmissions of the sidelink transmission, that the one or more TDRA field values are not indicative of future reservations for retransmissions of a second sidelink transmission associated with the second SCI message.

Aspect 10: The method of any of aspects 1 through 9, further comprising: identifying one or more additional TDRA field values in the second SCI message, wherein the one or more additional TDRA field values are indicative of future reservations for retransmissions of a second sidelink transmission associated with the second SCI message.

Aspect 11: The method of any of aspects 1 through 10, further comprising: interpret one or more FDRA field values in the second SCI message based at least in part on the one or more TDRA field value being indicative of the release of at least the first subset of the set of resources reserved for the retransmissions of the sidelink transmission, wherein the interpretation of the one or more FDRA field values pertains to the release of at least the first subset of the set of resources reserved for the retransmissions of the sidelink transmission.

Aspect 12: The method of any of aspects 1 through 11, further comprising: identifying one or more additional fields within the second SCI message; and identifying that the release pertains to the at least one retransmission occasion of the one or more retransmission occasions based at least in part on the one or more TDRA field values, the one or more additional fields within the second SCI message, or both.

Aspect 13: The method of aspect 12, wherein the one or more additional fields within the second SCI message comprise a first field associated with DMRSs, a second field associated with ports used for DMRSs, a third field associated with priority of sidelink communications, a fourth field associated with a PSFCH overhead, a fifth field associated with an FDRA, or any combination thereof.

Aspect 14: The method of any of aspects 1 through 13, further comprising: transmitting the sidelink transmission in accordance with the first SCI message; and receive, from a second UE, a feedback message indicating that the second UE received the sidelink transmission, wherein the UE identifies the second SCI message by generating the second SCI message based at least in part on the feedback message.

Aspect 15: The method of any of aspects 1 through 14, wherein identifying the second SCI message comprises receiving the second SCI message from a second UE.

Aspect 16: The method of any of aspects 1 through 15, wherein the one or more TDRA field values comprise one or more TRIVs which are not associated with time resource reservations.

Aspect 17: The method of any of aspects 1 through 16, further comprising: receive a control message comprising an indication of a set of TRIVs including a first subset of TRIVs associated with time resource reservations, and a second subset of TRIVs which are not associated with time resource reservations, wherein the one or more TDRA field values in the second SCI message include a TRIV from the second subset of TRIVs.

Aspect 18: The method of any of aspects 1 through 17, further comprising: transmitting, via the first SCI message, a first identifier that associates the first SCI message with the first UE, a second UE to which the sidelink transmission was directed, or both, wherein the second SCI message comprises a second identifier that associates the second SCI message with a same UE identified by the first identifier.

Aspect 19: The method of any of aspects 1 through 18, wherein the second SCI message is identified within the set of resources reserved for retransmissions of the sidelink transmission.

Aspect 20: The method of any of aspects 1 through 19, further comprising: identifying a time period preceding a first retransmission occasion of the one or more retransmission occasions during which at least the first retransmission occasion is not to be released, wherein the second SCI message is identified before a start of the identified time period.

Aspect 21: The method of any of aspects 1 through 20, further comprising: identifying a time period following the transmission of the first SCI message in which the one or more retransmission occasions are not to be released, wherein the second SCI message is identified after an end of the identified time period.

Aspect 22: The method of aspect 21, further comprising: identifying a hybrid automatic repeat request configuration associated with sidelink communications, wherein identifying the time period following the transmission of the first SCI message is based at least in part on the determined hybrid automatic repeat request configuration.

Aspect 23: The method of any of aspects 1 through 22, further comprising: receive, from a second UE to which the sidelink transmission was directed, a third UE, or both, a second sidelink transmission over a set of resources associated with the at least one retransmission occasion released via the second SCI message, wherein the second sidelink transmission is received based at least in part on identifying the second SCI message.

Aspect 24: The method of any of aspects 1 through 23, wherein transmitting the retransmissions of the sidelink transmission on only the second subset of the set of resources comprises refraining from performing any retransmissions of the sidelink transmission.

Aspect 25: The method of any of aspects 1 through 24, further comprising: identifying, based at least in part on transmission of the first SCI message, a TTI range for transmission of the second SCI message, a subchannel range for transmission of the second SCI message, or both, wherein identifying the second SCI message is based at least in part on identifying the TTI range, the subchannel range, or both.

Aspect 26: The method of aspect 25, further comprising: receive a control message indicating a relationship between the first SCI message and the TTI range, the subchannel range, or both.

Aspect 27: The method of any of aspects 1 through 26, further comprising: identifying a set of candidate resources for transmission of the second SCI message based at least in part on receiving the first SCI message, wherein the set of candidate resources have a higher priority for being selected for transmission of the second SCI message than for being selected for other sidelink transmissions; and select, from the set of candidate resources, a set of resources for transmission of the second SCI message based at least in part on the set of candidate resources having the higher priority.

Aspect 28: The method of any of aspects 1 through 27, further comprising: determining a first channel occupancy ratio of a sidelink communication network prior to transmitting the second SCI; and determining a second channel occupancy ratio of the sidelink communication network based at least in part on identifying the second SCI providing the release.

Aspect 29: An apparatus for wireless communication at a first UE, comprising a processor; memory coupled with the processor; and instructions stored in the memory and executable by the processor to cause the apparatus to perform a method of any of aspects 1 through 28.

Aspect 30: An apparatus for wireless communication at a first UE, comprising at least one means for performing a method of any of aspects 1 through 28.

Aspect 31: A non-transitory computer-readable medium storing code for wireless communication at a first UE, the code comprising instructions executable by a processor to perform a method of any of aspects 1 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first user equipment (UE), comprising:
    a processor,
    memory coupled with the processor; and
    instructions stored in the memory and executable by the processor to cause the apparatus to:
        transmit, during a first transmission time interval, a first sidelink control information message associated with a sidelink transmission from the first UE, wherein the first sidelink control information message comprises a first indication of a set of resources reserved for retransmissions of the sidelink transmission at one or more retransmission occasions;
        identify, during a second transmission time interval that is after the first transmission time interval, a second sidelink control information message associated with the first sidelink control information message, the second sidelink control information message including one or more time domain resource allocation field values indicative of at least a first subset of the set of resources and a release of the at least first subset of the set of resources reserved for the retransmissions of the sidelink transmission, the release pertaining to at least one retransmission occasion of the one or more retransmission occasions; and
        transmit the retransmissions of the sidelink transmission on only a second subset of the set of resources in accordance with the release of the first subset of the set of resources.

2. The apparatus of claim 1, wherein the one or more time domain resource allocation field values comprise an identifier of the first sidelink control information message, wherein the instructions are further executable by the processor to cause the apparatus to:
    identify that the release pertains to the at least one retransmission occasion based at least in part on the identifier of the first sidelink control information message.

3. The apparatus of claim 1, wherein the instructions are further executable by the processor to cause the apparatus to:
    identify one or more sidelink control information message transmissions that are within a configured transmission time interval range and subchannel range of the second sidelink control information message;
    identify, based at least in part on the one or more time domain resource allocation field values, the first sidelink control information message from the one or more sidelink control information message transmissions; and
    identify that the release pertains to the at least one retransmission occasion based at least in part on the identification of the first sidelink control information message.

4. The apparatus of claim 1, wherein the instructions are further executable by the processor to cause the apparatus to:
    identify that the one or more time domain resource allocation field values are associated with a checksum or a hashing function of at least a portion of data included within the first sidelink control information message; and
    identify that the release pertains to the at least one retransmission occasion based at least in part on identifying that the one or more time domain resource allocation field values within the second sidelink control information message are associated with the checksum or the hashing function of at least the portion of data included within the first sidelink control information message.

5. The apparatus of claim 4, wherein the data included within the first sidelink control information message comprises a first cyclic redundancy check portion of the first sidelink control information message, a set of time domain resource allocation values of the first sidelink control information message, a set of frequency domain resource allocation values of the first sidelink control information message, or any combination thereof.

6. The apparatus of claim 1, wherein the instructions are further executable by the processor to cause the apparatus to:
    identify that the one or more time domain resource allocation field values are associated with a checksum or a hashing function of an identifier associated with the first UE, the first transmission time interval, or both; and
    identify that the release pertains to the at least one retransmission occasion based at least in part on identifying that the one or more time domain resource allocation field values within the second sidelink control information message are associated with the checksum or the hashing function of the identifier associated with the first UE, the first transmission time interval, or both.

7. The apparatus of claim 1, wherein the second sidelink control information message comprises an identifier that associates the second sidelink control information message with the first UE, and the instructions are further executable by the processor to cause the apparatus to:
identify that the one or more time domain resource allocation field values comprise an indication of a release of all retransmission occasions associated with the first UE or the second UE identified by the identifier; and
identify that the release pertains to each of the one or more retransmission occasions based at least in part on the one or more time domain resource allocation field values.

8. The apparatus of claim 1, wherein the one or more time domain resource allocation field values comprise an identifier of the at least one retransmission occasion associated with the release, wherein the instructions are further executable by the processor to cause the apparatus to:
identify that the release pertains to the at least one retransmission occasion based at least in part on the identifier of the at least one retransmission occasion.

9. The apparatus of claim 1, wherein the instructions are further executable by the processor to cause the apparatus to:
determine, based at least in part on the one or more time domain resource allocation field values being indicative of the release of at least the first subset of the set of resources reserved for the retransmissions of the sidelink transmission, that the one or more time domain resource allocation field values are not indicative of future reservations for retransmissions of a second sidelink transmission associated with the second sidelink control information message.

10. The apparatus of claim 1, wherein the instructions are further executable by the processor to cause the apparatus to:
identify one or more additional time domain resource allocation field values in the second sidelink control information message, wherein the one or more additional time domain resource allocation field values are indicative of future reservations for retransmissions of a second sidelink transmission associated with the second sidelink control information message.

11. The apparatus of claim 1, wherein the instructions are further executable by the processor to cause the apparatus to:
interpret one or more frequency domain resource allocation field values in the second sidelink control information message based at least in part on the one or more time domain resource allocation field value being indicative of the release of at least the first subset of the set of resources reserved for the retransmissions of the sidelink transmission, wherein the interpretation of the one or more frequency domain resource allocation field values pertains to the release of at least the first subset of the set of resources reserved for the retransmissions of the sidelink transmission.

12. The apparatus of claim 1, wherein the instructions are further executable by the processor to cause the apparatus to:
identify one or more additional fields within the second sidelink control information message; and
identify that the release pertains to the at least one retransmission occasion of the one or more retransmission occasions based at least in part on the one or more time domain resource allocation field values, the one or more additional fields within the second sidelink control information message, or both.

13. The apparatus of claim 12, wherein the one or more additional fields within the second sidelink control information message comprise a first field associated with demodulation reference signals, a second field associated with ports used for demodulation reference signals, a third field associated with priority of sidelink communications, a fourth field associated with a physical sidelink feedback channel overhead, a fifth field associated with a frequency domain resource allocation, or any combination thereof.

14. The apparatus of claim 1, wherein the instructions are further executable by the processor to cause the apparatus to:
transmit the sidelink transmission in accordance with the first sidelink control information message; and
receive, from a second UE, a feedback message indicating that the second UE received the sidelink transmission, wherein the UE identifies the second sidelink control information message by generating the second sidelink control information message based at least in part on the feedback message.

15. The apparatus of claim 1, wherein the instructions to identify the second sidelink control information message are executable by the processor to cause the apparatus to receive the second sidelink control information message from a second UE.

16. The apparatus of claim 1, wherein the one or more time domain resource allocation field values comprise one or more time resource indicator values which are not associated with time resource reservations.

17. The apparatus of claim 1, wherein the instructions are further executable by the processor to cause the apparatus to:
receive a control message comprising an indication of a set of time resource indicator values including a first subset of time resource indicator values associated with time resource reservations, and a second subset of time resource indicator values which are not associated with time resource reservations, wherein the one or more time domain resource allocation field values in the second sidelink control information message include a time resource indicator value from the second subset of time resource indicator values.

18. The apparatus of claim 1, wherein the instructions are further executable by the processor to cause the apparatus to:
transmit, via the first sidelink control information message, a first identifier that associates the first sidelink control information message with the first UE, a second UE to which the sidelink transmission was directed, or both, wherein the second sidelink control information message comprises a second identifier that associates the second sidelink control information message with a same UE identified by the first identifier.

19. The apparatus of claim 1, wherein the second sidelink control information message is identified within the set of resources reserved for retransmissions of the sidelink transmission.

20. The apparatus of claim 1, wherein the instructions are further executable by the processor to cause the apparatus to:
identify a time period preceding a first retransmission occasion of the one or more retransmission occasions during which at least the first retransmission occasion is not to be released, wherein the second sidelink control information message is identified before a start of the identified time period.

21. The apparatus of claim 1, wherein the instructions are further executable by the processor to cause the apparatus to:
identify a time period following the transmission of the first sidelink control information message in which the one or more retransmission occasions are not to be released, wherein the second sidelink control information message is identified after an end of the identified time period.

22. The apparatus of claim 21, wherein the instructions are further executable by the processor to cause the apparatus to:
identify a hybrid automatic repeat request configuration associated with sidelink communications, wherein identifying the time period following the transmission of the first sidelink control information message is based at least in part on the determined hybrid automatic repeat request configuration.

23. The apparatus of claim 1, wherein the instructions are further executable by the processor to cause the apparatus to:
receive, from a second UE to which the sidelink transmission was directed, a third UE, or both, a second sidelink transmission over a set of resources associated with the at least one retransmission occasion released via the second sidelink control information message, wherein the second sidelink transmission is received based at least in part on identifying the second sidelink control information message.

24. The apparatus of claim 1, wherein the instructions to transmit the retransmissions of the sidelink transmission on only the second subset of the set of resources are executable by the processor to cause the apparatus to refrain from performing any retransmissions of the sidelink transmission.

25. The apparatus of claim 1, wherein the instructions are further executable by the processor to cause the apparatus to:
identify, based at least in part on transmission of the first sidelink control information message, a transmission time interval range for transmission of the second sidelink control information message, a subchannel range for transmission of the second sidelink control information message, or both, wherein identifying the second sidelink control information message is based at least in part on identifying the transmission time interval range, the subchannel range, or both.

26. The apparatus of claim 25, wherein the instructions are further executable by the processor to cause the apparatus to:
receive a control message indicating a relationship between the first sidelink control information message and the transmission time interval range, the subchannel range, or both.

27. The apparatus of claim 1, wherein the instructions are further executable by the processor to cause the apparatus to:
identify a set of candidate resources for transmission of the second sidelink control information message based at least in part on receiving the first sidelink control information message, wherein the set of candidate resources have a higher priority for being selected for transmission of the second sidelink control information message than for being selected for other sidelink transmissions; and
select, from the set of candidate resources, a set of resources for transmission of the second sidelink control information message based at least in part on the set of candidate resources having the higher priority.

28. The apparatus of claim 1, wherein the instructions are further executable by the processor to cause the apparatus to:
determine a first channel occupancy ratio of a sidelink communication network prior to transmitting the second sidelink control information; and
determine a second channel occupancy ratio of the sidelink communication network based at least in part on identifying the second sidelink control information providing the release.

29. A method for wireless communication at a first user equipment (UE), comprising:
transmitting, during a first transmission time interval, a first sidelink control information message associated with a sidelink transmission from the first UE, wherein the first sidelink control information message comprises a first indication of a set of resources reserved for retransmissions of the sidelink transmission at one or more retransmission occasions;
identifying, during a second transmission time interval that is after the first transmission time interval, a second sidelink control information message associated with the first sidelink control information message, the second sidelink control information message including one or more time domain resource allocation field values indicative of at least a first subset of the set of resources and a release of the at least first subset of the set of resources reserved for the retransmissions of the sidelink transmission, the release pertaining to at least one retransmission occasion of the one or more retransmission occasions; and
transmitting the retransmissions of the sidelink transmission on only a second subset of the set of resources in accordance with the release of the first subset of the set of resources.

30. An apparatus for wireless communication at a first user equipment (UE), comprising:
means for transmitting, during a first transmission time interval, a first sidelink control information message associated with a sidelink transmission from the first UE, wherein the first sidelink control information message comprises a first indication of a set of resources reserved for retransmissions of the sidelink transmission at one or more retransmission occasions;
means for identifying, during a second transmission time interval that is after the first transmission time interval, a second sidelink control information message associated with the first sidelink control information message, the second sidelink control information message including one or more time domain resource allocation field values indicative of at least a first subset of the set of resources and a release of the at least first subset of the set of resources reserved for the retransmissions of the sidelink transmission, the release pertaining to at least one retransmission occasion of the one or more retransmission occasions; and
means for transmitting the retransmissions of the sidelink transmission on only a second subset of the set of resources in accordance with the release of the first subset of the set of resources.

* * * * *